United States Patent
Sakata et al.

(10) Patent No.: US 10,192,248 B2
(45) Date of Patent: Jan. 29, 2019

(54) SERVER DEVICE, INFORMATION DEVICE, POWER OUTLET, CHARGING INFORMATION GENERATING METHOD, AND CHARGING INFORMATION GENERATING PROGRAM

(71) Applicant: Panasonic Intellectual Property Corporation of America, Torrance, CA (US)

(72) Inventors: Kotaro Sakata, Tokyo (JP); Yasushi Sugiyama, Tokyo (JP); Kimio Minami, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 781 days.

(21) Appl. No.: 14/647,468

(22) PCT Filed: Jul. 9, 2014

(86) PCT No.: PCT/JP2014/003643
§ 371 (c)(1),
(2) Date: May 27, 2015

(87) PCT Pub. No.: WO2015/045235
PCT Pub. Date: Apr. 2, 2015

(65) Prior Publication Data
US 2015/0317706 A1    Nov. 5, 2015

(30) Foreign Application Priority Data

Sep. 30, 2013  (JP) ................................ 2013-203604

(51) Int. Cl.
*G06Q 30/00*  (2012.01)
*G06Q 30/06*  (2012.01)
(Continued)

(52) U.S. Cl.
CPC ....... *G06Q 30/0601* (2013.01); *G06Q 20/145* (2013.01); *G06Q 20/387* (2013.01);
(Continued)

(58) Field of Classification Search
CPC .......... H02J 50/40; G06Q 30/00; G06Q 30/06
(Continued)

(56) References Cited

U.S. PATENT DOCUMENTS

2002/0153862 A1    10/2002    Kuroki
2009/0037269 A1*    2/2009    Bassemir ............... G06Q 30/02
                                                                 705/14.39

FOREIGN PATENT DOCUMENTS

EP    1 460 745    9/2004
JP    2984617    11/1999
(Continued)

OTHER PUBLICATIONS

Anonymous, "Caribou Coffee Offers Free Wi-Fi Service for Customers; Secure Wi-Fi Program Designed to Accommodate Caribou Coffee's Frequent Users," Business Wire, Aug. 28, 2006.*
(Continued)

*Primary Examiner* — Brandy A Zukanovich
(74) *Attorney, Agent, or Firm* — Wenderoth, Lind & Ponack, L.L.P.

(57) ABSTRACT

Provided is a server device whereby more customers are gathered at a store, and the spending per customer is increased. In a server device (50): a storage unit (54) stores charging parameters corresponding to purchase costs; a wired communication unit (53) receives information of the purchase cost which is inputted into a cash register; and a generating unit (55*a*) retrieves, from the charging parameters which are stored in the storage unit (54), the charging parameter corresponding to the purchase cost which is received by the wired communication unit (53), and, on the
(Continued)

basis of the charging parameter, generates charging information which indicates either the charging time or the charging quantity at which a power outlet carries out charging.

13 Claims, 23 Drawing Sheets

(51) Int. Cl.
  *G06Q 30/02* (2012.01)
  *H02J 7/00* (2006.01)
  *G06Q 20/14* (2012.01)
  *G06Q 20/38* (2012.01)
  *G07F 15/00* (2006.01)

(52) U.S. Cl.
  CPC ......... *G06Q 30/02* (2013.01); *G06Q 30/0235* (2013.01); *G06Q 30/0238* (2013.01); *G06Q 30/06* (2013.01); *G07F 15/006* (2013.01); *H02J 7/0027* (2013.01)

(58) Field of Classification Search
  USPC .................................................. 705/26.1, 27.1
  See application file for complete search history.

(56) References Cited

FOREIGN PATENT DOCUMENTS

| | | |
|---|---|---|
| JP | 2006-065800 | 3/2006 |
| JP | 2008-090674 | 4/2008 |
| JP | 2008-158620 | 7/2008 |
| JP | 4284883 | 6/2009 |
| JP | 2009-183135 | 8/2009 |
| JP | 2010-250507 | 11/2010 |
| JP | 2010-250565 | 11/2010 |
| JP | 2013-008267 | 1/2013 |
| JP | 2013-034322 | 2/2013 |
| WO | WO 2013/102908 A1 * | 7/2013 |

OTHER PUBLICATIONS

International Search Report dated Aug. 26, 2014 in International (PCT) Application No. PCT/JP2014/003643.

Extended European Search Report dated Aug. 17, 2016 in corresponding European patent application No. 14 84 9735.

* cited by examiner

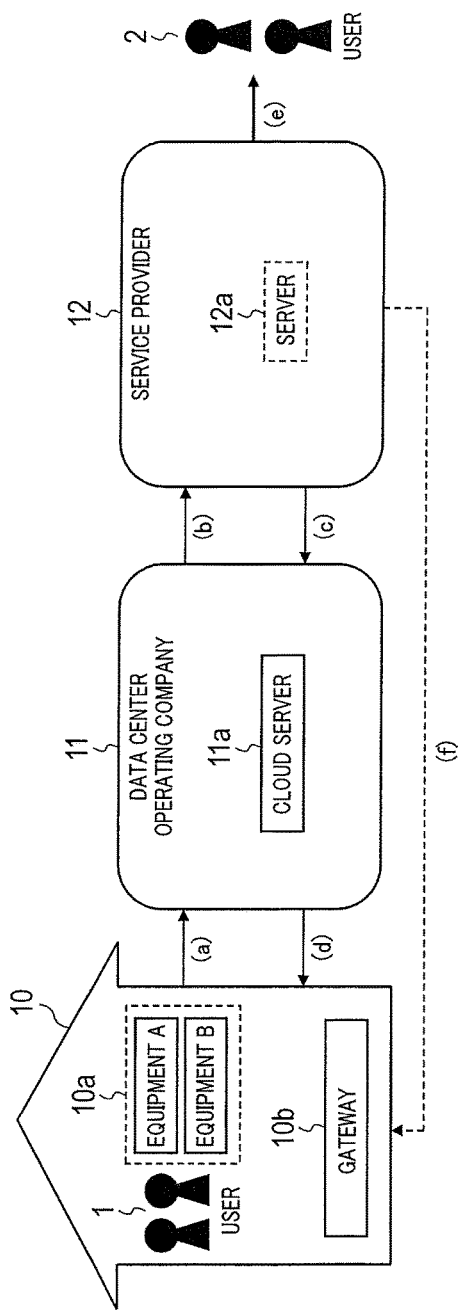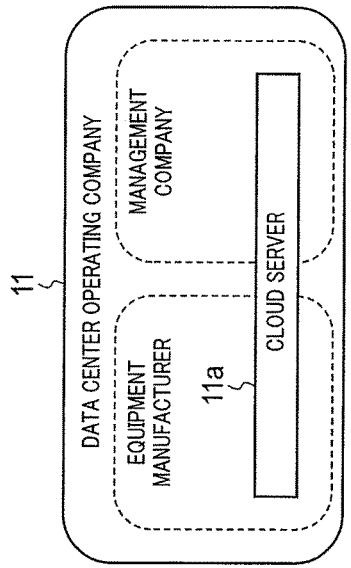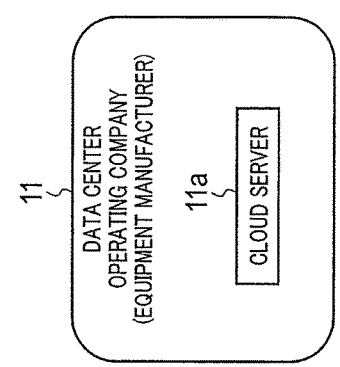
FIG. 1A
FIG. 1B
FIG. 1C

| DAY OF THE WEEK | TIME SLOT | ELECTRIC CHARGING BONUS POINT (PER 100 YEN) | SPECIFIC ELECTRIC CHARGING BONUS POINT (PER 100 YEN) |
|---|---|---|---|
| SUNDAY | 21:00–10:00 | 500 | 1000 |
| | 10:00–14:00 | 100 | 200 |
| | 14:00–17:00 | 300 | 600 |
| | 17:00–21:00 | 100 | 200 |
| MONDAY | 21:00–10:00 | 800 | 1600 |
| | ... | ... | ... |
| ... | | | |

| STORE ID | TOTAL NUMBER OF RECEPTACLES | NUMBER OF RECEPTACLES BEING USED | CROWDED DEGREE | LOWEST ELECTRICITY EXPENSE TIME SLOT | LOCATION INFORMATION |
|---|---|---|---|---|---|
| 1001 | 53 | 16 | 30% | 22:00–7:00 | 35.65⋯, 139.74⋯ |
| 1002 | 65 | 60 | 92% | 23:00–8:00 | 35.39⋯, 139.75⋯ |
| 1003 | 45 | 28 | 62% | 22:00–7:00 | 35.68⋯, 139.76⋯ |
| ⋯ | | | | | ⋯ |

| CROWDED DEGREE | MAGNIFICATION |
|---|---|
| LOWER THAN 25% | 2 |
| 25–50% | 1.5 |
| 50–75% | 1 |
| 75% OR HIGHER | 0.5 |

| USER ID | ACCUMULATED ELECTRIC CHARGING BONUS POINT | MEMBERSHIP FLAG | POSSESSED PRODUCT | LAST VISIT STORE ID | SPENDING PERIOD | ELECTRIC CHARGING FLAG |
|---|---|---|---|---|---|---|
| 100001 | 19800 | Y | A1509, C1215, K1528 | 1001 | 21:04–23:00 | Y |
| 100002 | 30100 | Y | None | 8621 | 20:48– | N |
| 100003 | 200 | N | A1509, B1102 | 3787 | – | Y |
| ... | ... | ... | ... | ... | ... | ... |

# SERVER DEVICE, INFORMATION DEVICE, POWER OUTLET, CHARGING INFORMATION GENERATING METHOD, AND CHARGING INFORMATION GENERATING PROGRAM

TECHNICAL FIELD

The present invention relates to a server apparatus, information equipment, a receptacle, an electric charging information generation method and an electric charging information generation program in an electric charging system having a register that receives input of a purchase amount of a product or service, the receptacle that charges up connected information equipment and the server apparatus that determines an electric charging period or an electric charge amount of the information equipment.

BACKGROUND ART

In recent years, performance of information equipment has dramatically improved. As the power consumption of information equipment increases, it becomes more often that the information equipment needs to be charged up at places other than home. However, it is prohibited to charge up information equipment using a receptacle provided at a building in the town without permission. In order to avoid a battery of the information equipment from running out while on the go, it is necessary to always carry around a spare battery.

Various proposals have been made to eliminate such inconvenience. For example, Patent Literature (hereinafter, referred to as "PTL") 1 discloses an electric charging terminal that bills a mobile terminal apparatus, which is registered in advance, when the registered mobile terminal apparatus is charged up.

Further, PTL 2 discloses a billing server which bills a user who charges up a mobile terminal from a receptacle for commercial use according to an amount of consumed power and pays an amount corresponding to the amount of consumed power to an account of an owner of the receptacle for commercial use providing power.

Further, PTL 3 discloses a receptacle billing apparatus which collects fee corresponding to the amount of consumed power from cash fed from a cash feeding port. Still further, PTL 4 discloses a mobile phone electric charging system which specifies a user of a mobile phone by exchanging information with the mobile phone and bills a user of the mobile phone for electric charging of the mobile phone.

CITATION LIST

Patent Literature

PTL 1
Japanese Patent No. 2984617
PTL 2
Japanese Patent Application Laid-Open No. 2010-250565
PTL 3
Japanese Patent Application Laid-Open No. 2010-250507
PTL 4
Japanese Patent No. 4284883

SUMMARY OF INVENTION

Technical Problem

However, while the above-described related art enables stores such as restaurants to draw customers who want to charge up their information equipment, the related art does not directly contribute to increase of sales per customer.

In other words, because the above-described related art is not to encourage customers gathering in the store to purchase products or service, and a billed amount on a person who charges up his information equipment is not significant either, the related art does not substantially increase sales per customer.

An object of the present invention is to provide a server apparatus, information equipment, a receptacle, an electric charging information generation method and an electric charging information generation program capable of not only drawing more customers to a store but also increasing sales per customer.

Solution to Problem

A server apparatus according to the present invention is a server apparatus in an electric charging system including: a register that receives input of a purchase amount of a product or service; and a receptacle that charges up connected information equipment, the server apparatus including: a storage section that stores an electric charging parameter corresponding to the purchase amount; a receiving section that receives information of the purchase amount input to the register; and a generating section that searches for an electric charging parameter corresponding to the purchase amount received at the receiving section from the electric charging parameters stored in the storage section and that generates electric charging information indicating an electric charging period or an electric charge amount, the electric charging period being a period during which the receptacle performs electric charging based on the electric charging parameter, and the electric charge amount being an amount of electric charging performed by the receptacle based on the electric charging parameter.

Information equipment according to the present invention is information equipment in an electric charging system including: a register that receives input of a purchase amount of a product or service; a receptacle that performs electric charging; and a server apparatus that receives the information of the purchase amount, that searches for an electric charging parameter corresponding to the purchase amount from electric charging parameters corresponding to the purchase amount and that generates electric charging information indicating an electric charging period or an electric charge amount, the electric charging period being a period during which the receptacle performs electric charging based on the electric charging parameter, and the electric charge amount being an amount of electric charging performed by the receptacle based on the electric charging parameter, the information equipment including: a storage section that stores identification information for identifying the information equipment; a receiving section that receives information of the purchase amount from the register and that receives the electric charging information from the server apparatus; and a transmitting section that transmits the identification information and the information of the purchase amount to the server apparatus and that transmits the electric charging information to the receptacle.

Information equipment according to the present invention is information equipment in an electric charging system including: a register that receives input of a purchase amount of a product or service; a receptacle that performs electric charging and transmitting information of the purchase amount, and a server apparatus that receives the information of the purchase amount, that searches for an electric charging parameter corresponding to the purchase amount from electric charging parameters corresponding to the purchase amount and that generates electric charging information indicating an electric charging period or an electric charge amount, the electric charging period being a period during which the receptacle performs electric charging based on the electric charging parameter, and the electric charge amount being an amount of electric charging performed by the receptacle based on the electric charging parameter, the information equipment including: a storage section that stores identification information for identifying the information equipment; a receiving section that receives the information of the purchase amount from the register; and a transmitting section that transmits the identification information and the information of the purchase amount to the receptacle.

A receptacle according to the present invention is a receptacle for electric charging in an electric charging system including: a register that receives input of a purchase amount of a product or service; information equipment that receives information of the purchase amount from the register and that forwards the information of the purchase amount; and a server apparatus that receives the information of the purchase amount, that searches for an electric charging parameter corresponding to the purchase amount from electric charging parameters corresponding to the purchase amount, and that generates electric charging information indicating an electric charging period or an electric charge amount, the electric charging period being a period during which electric charging is performed based on the electric charging parameter, and the electric charge amount being an amount of electric charging performed based on the electric charging parameter, the receptacle including: a receiving section that receives the electric charging information from the information equipment; and an electric charging section that charges up the information equipment for the electric charging period or by the electric charge amount based on the electric charging information.

A receptacle according to the present invention is a receptacle for electric charging in an electric charging system including: a register that receives input of a purchase amount of a product or service; information equipment that receives information of the purchase amount from the register; and a server apparatus that receives the information of the purchase amount, that searches for an electric charging parameter corresponding to the purchase amount from electric charging parameters corresponding to the purchase amount and that generates electric charging information indicating an electric charging period or an electric charge amount, the electric charging period being a period during which electric charging is performed based on the electric charging parameter, and the electric charge amount being an amount of electric charging performed based on the electric charging parameter, the receptacle including: a receiving section that receives identification information for identifying the information equipment and the information of the purchase amount from the information equipment and that receives the electric charging information from the server apparatus; a transmitting section that transmits the identification information and the information of the purchase amount to the server apparatus; and an electric charging section that charges up the information equipment for the electric charging period or by the electric charge amount based on the electric charging information.

An electric charging information generation method according to the present invention is an electric charging information generation method performed by a server apparatus in an electric charging system including: a register that receives input of a purchase amount of a product or service; and a receptacle that charges up connected information equipment, the electric charging information generation method including: receiving information of the purchase amount input to the register; and searching for an electric charging parameter corresponding to the purchase amount received in the receiving, from electric charging parameters corresponding to the purchase amount stored in advance in a storage section and generating electric charging information indicating an electric charging period or an electric charge amount, the electric charging period being a period during which the receptacle performs electric charging based on the electric charging parameter, and the electric charge amount being an amount of electric charging performed by the receptacle based on the electric charging parameter.

An electric charging information generation program according to the present invention is causing an electric charging information generation program computer in an electric charging system including: a register that receives input of a purchase amount of a product or service; and a receptacle that charges up connected information equipment to execute processing including: receiving information of the purchase amount input to the register; and searching for an electric charging parameter corresponding to the purchase amount from electric charging parameters corresponding to the purchase amount stored in advance in a storage section and generating electric charging information indicating an electric charging period or an electric charge amount, the electric charging period being a period during which the receptacle performs electric charging based on the electric charging parameter, and the electric charge amount being an amount of electric charging performed by the receptacle based on the electric charging parameter.

Advantageous Effects of Invention

According to the present invention, it is possible not only to draw more customers to the store but also to increase sales per customer by providing incentive for purchasing a product or service to a customer.

BRIEF DESCRIPTION OF DRAWINGS

FIGS. 1A, 1B and 1C illustrate outline of an electric charging system according to the present embodiment;

FIG. 7 illustrates an example of electric charging bonus point information;

FIG. 8 illustrates an example of store information;

FIG. 9 illustrates an example of crowded degree adjustment information;

FIG. 10 illustrates an example of user information;

DESCRIPTION OF EMBODIMENTS

Figure 2:
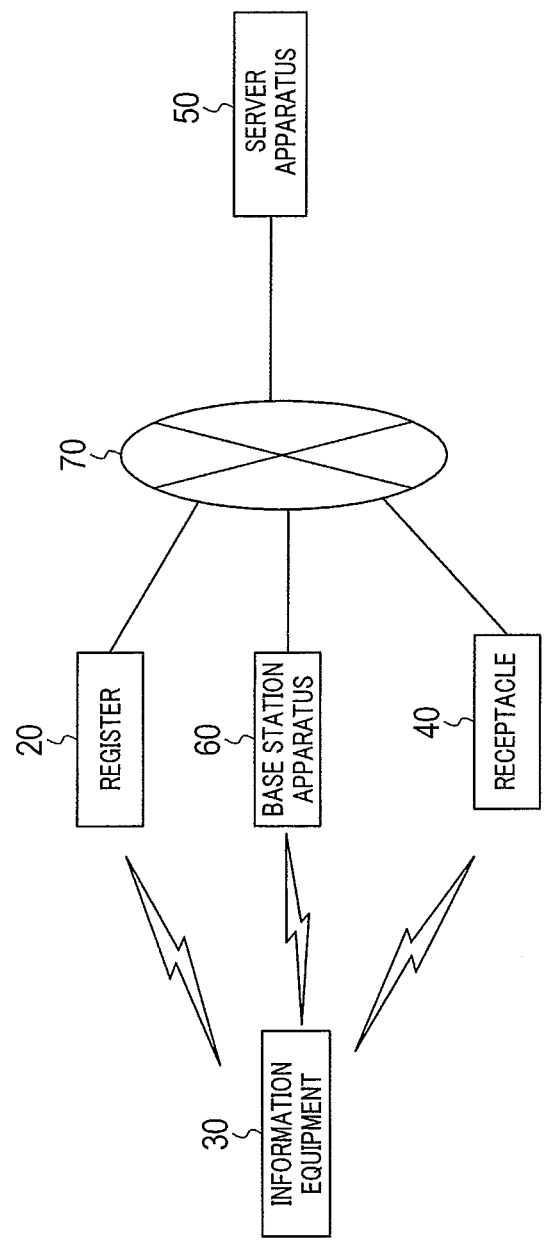
FIG. 2 is a block diagram illustrating an exemplary configuration of an electric charging system according to Embodiment 1 of the present invention.

Embodiments of the present invention will be described below in detail with reference to the accompanying drawings.

(Whole Picture of Service to be Provided)

FIGS. 1A, 1B and 1C illustrate outline of an electric charging system according to the present embodiment. FIG. 1A illustrates the whole picture of the electric charging system according to the present embodiment. Group 10 is, for example, a store, or the like, including various sizes of stores. Group 10 includes equipment A and equipment B which are a plurality of equipment 10a, and gateway 10b.

The plurality of pieces of equipment 10a include equipment which can be connected to the Internet (for example, a smartphone, a PC, a POS (Point of Sale System) register, a smart plug, or the like), and equipment which cannot be connected to the Internet by itself. The plurality of pieces of equipment 10a also include equipment which can be connected to the Internet via gateway 10b although the equipment cannot be connected to the Internet by itself. Group 10 further includes user 1 who uses the plurality of pieces of equipment 10a.

Data center operating company 11 includes cloud server 11a. Cloud server 11a is a virtual server which collaborates with various pieces of equipment via the Internet, and mainly manages huge data (big data) which is difficult to be dealt with by a typical database management tool, or the like. Data center operating company 11 manages data, manages cloud server 11a or operates a data center which manages data and cloud server 11a. The operation performed by data center operating company 11 will be described in detail later.

Here, data center operating company 11 is not limited to a company that only manages data and operates cloud server 11a. For example, when an equipment manufacturer which develops and manufactures one equipment among the plurality of pieces of equipment 10a also manages data and cloud server 11a, the equipment manufacturer corresponds to data center operating company 11 (FIG. 1B).

Further, data center operating company 11 is not limited to a single company. For example, when an equipment manufacturer manages data and operates cloud server 11a together with other management company, or the equipment manufacturer and the other management company share management and operation, both or any one of them corresponds to data center operating company 11 (FIG. 1C).

Service provider 12 has server 12a. Server 12a described here includes, for example, any size of a memory inside a PC for personal use. Further, there is a case where the service provider does not have server 12a.

It should be noted that in the above-described service, gateway 10b is not essential. For example, when cloud server 11a manages all data, gateway 10b is not necessary. Further, gateway 10b is also not necessary when there is no equipment which cannot be connected to the Internet by itself, for example, when all the equipment in the store is connected to the Internet.

The flow of information in the above-described service will now be described. First, equipment A or equipment B of group 10 transmits log information to cloud server 11a of data center operating company 11. Cloud server 11a accumulates log information of equipment A or equipment B ((a) in FIG. 1A).

Here, the log information refers to, for example, information indicating operation states, operation time and date, or the like, of the plurality of equipment 10a. For example, the log information refers to information indicating operation states, operation time and date, or the like, of a smartphone, a PC, a POS register, a smart plug, or the like, but the log information is not limited to these, and refers to all the information which can be acquired from any equipment.

There is a case where the log information is directly provided to cloud server 11a from the plurality of pieces of equipment 10a themselves via the Internet. Further, the log information may be accumulated in gateway 10b once from the plurality of pieces of equipment 10a and may be provided to cloud server 11a from gateway 10b.

Subsequently, cloud server 11a of data center operating company 11 provides the accumulated log information to service provider 12 in a predetermined unit. Here, this unit may be a unit in which the data center operating company can organize the accumulated information and provide the information to service provider 12 or a unit requested by service provider 12. The unit, although described as a "predetermined unit," does not have to be fixed, and the amount of information to be provided may change depending on the situation.

The log information is stored in server 12a of service provider 12 as appropriate ((b) in FIG. 1A). Service provider 12 organizes the log information so as to be compatible with service to be provided to the user and provides the information to the user. The user to which the information is provided may be user 1 who uses the plurality of pieces of equipment 10a or outside user 2.

The information may be provided to the user, for example, directly from service provider 12 ((f), (e) in FIG. 1A). Further, the information may be provided to the user, for example, via cloud server 11a of data center operating company 11 again ((c), (d) in FIG. 1A). Further, cloud server 11a of data center operating company 11 may organize the log information so as to be compatible with service to be provided to the user and may provide the information to service provider 12.

It should be noted that user 1 may be different from user 2, or user 1 and user 2 may be the same person.

Embodiment 1

FIG. 2 is a block diagram illustrating an exemplary configuration of an electric charging system according to Embodiment 1 of the present invention. As illustrated in FIG. 2, in this electric charging system, register 20, information equipment 30, receptacle 40, server apparatus 50 and base station apparatus 60 are connected via network 70. Register 20, information equipment 30 and receptacle 40 correspond to the above-described plurality of pieces of equipment 10a, while server apparatus 50 corresponds to the above-described cloud server 11a or server 12a.

Register 20 is a POS register which records an amount of a product or service purchased by a customer. Information equipment 30 is equipment such as a smartphone, a mobile phone and a personal computer, which performs information processing.

Receptacle 40 is equipment which supplies power to equipment such as information equipment 30, which operates using power. Server apparatus 50 is an apparatus which manages an electric charging period when information equipment 30 is charged up from receptacle 40. Base station apparatus 60 is an apparatus which performs radio communication with information equipment 30 and connects information equipment 30 to network 70. Each apparatus will be described in detail later.

Here, network 70 may be a wired network or a wireless network. Further, a wired network and a wireless network may exist in a mixed manner in network 70. Hereinafter, the description will be provided assuming that network 70 is a wired network. Further, while one or more registers 20, one or more information equipment 30, one or more receptacles 40, one or more server apparatuses 50 and one or more base station apparatuses 60 may be provided, FIG. 2 illustrates one register 20, one information equipment 30, one receptacle 40, one server apparatus 50 and one base station apparatus 60 to simplify the illustration.

Figure 3:
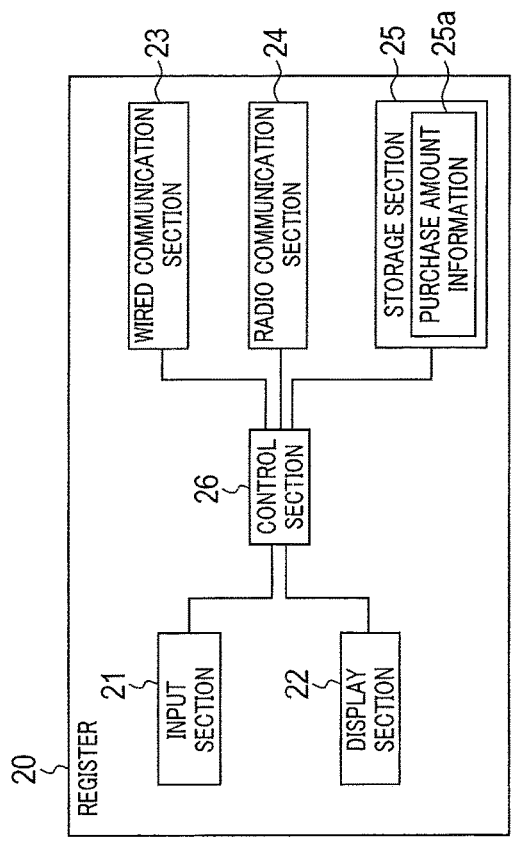
FIG. 3 is a block diagram illustrating an exemplary configuration of a register.

FIG. 3 is a block diagram illustrating an exemplary configuration of register 20. Register 20 includes input section 21, display section 22, wired communication section 23, radio communication section 24, storage section 25 and control section 26.

Input section 21 is an input device such as an input key. Display section 22 is a display device such as a liquid crystal display. Wired communication section 23 is a processing section which communicates with other apparatuses via network 70. Radio communication section 24 is a processing section which performs near-field radio communication with information equipment 30, or the like.

Storage section 25 is a storage device such as a memory and a hard disc apparatus. Storage section 25 stores purchase amount information 25a, or the like. Purchase amount information 25a is information of a purchase amount when the user purchases a product or service. This purchase amount information 25a also includes a store ID for identifying a store where the user purchases the product or the service, information of time, or the like.

This purchase amount information 25a is transmitted to information equipment 30 and forwarded to server apparatus 50 by information equipment 30. Control section 26 is a control device such as a processor, which controls each section of register 20.

Figure 4:
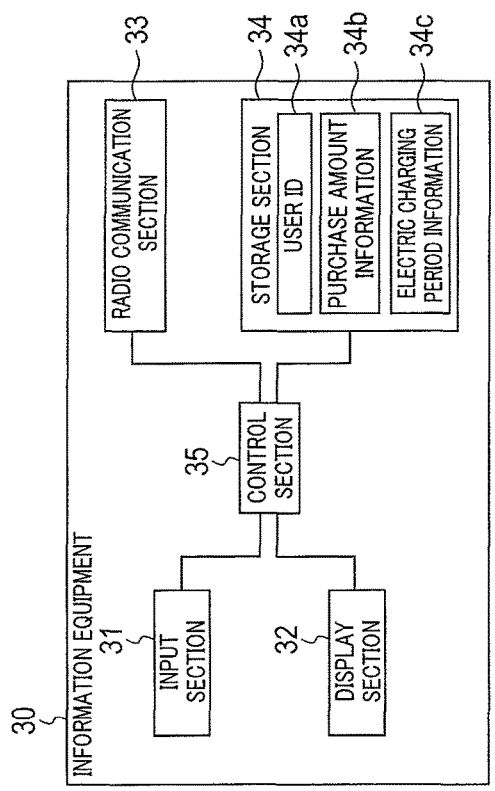
FIG. 4 is a block diagram illustrating an exemplary configuration of information equipment.

FIG. 4 is a block diagram illustrating an exemplary configuration of information equipment 30. Information equipment 30 includes input section 31, display section 32, radio communication section 33, storage section 34 and control section 35.

Input section 31 is an input device such as a touch panel and a keyboard. Display section 32 is a display device such as a liquid crystal display. Radio communication section 33 is a processing section which performs near-field radio communication with register 20 and receptacle 40 and communicates with server apparatus 50 via base station apparatus 60.

Storage section 34 is a storage device such as a memory and a hard disc apparatus. Storage section 34 stores, user ID 34a, purchase amount information 34b, electric charging period information 34c, or the like.

User ID 34a is identification information for identifying a user of information equipment 30. Purchase amount information 25a transmitted from register 20 is stored as purchase amount information 34b. Electric charging period information 34c is information of a period during which information equipment 30 can be charged up at receptacle 40. This electric charging period information 34c is information received from server apparatus 50. Control section 35 is a control device such as a processor which controls each section of information equipment 30.

Figure 5:
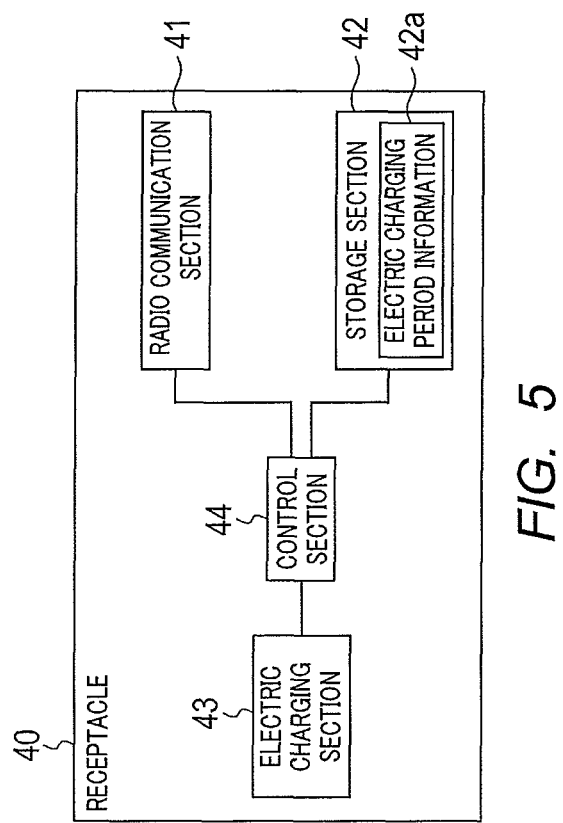
FIG. 5 is a block diagram illustrating an exemplary configuration of a receptacle.

FIG. 5 is a block diagram illustrating an exemplary configuration of receptacle 40. Receptacle 40 includes radio communication section 41, storage section 42, electric charging section 43 and control section 44.

Radio communication section 41 is a processing section which performs near-field radio communication with information equipment 30. Storage section 42 is a storage device such as a memory. Storage section 42 stores electric charging period information 42a. Electric charging period information 34c transmitted from information equipment 30 is stored as electric charging period information 42a.

Electric charging section 43 is a processing section which charges up information equipment 30, or the like. Electric charging section 43 reads out electric charging period information 42a from storage section 42 and charges up information equipment 30 only for a period designated by electric charging period information 42a. Control section 44 is a control device such as a processor, which controls each section of receptacle 40.

Figure 6:
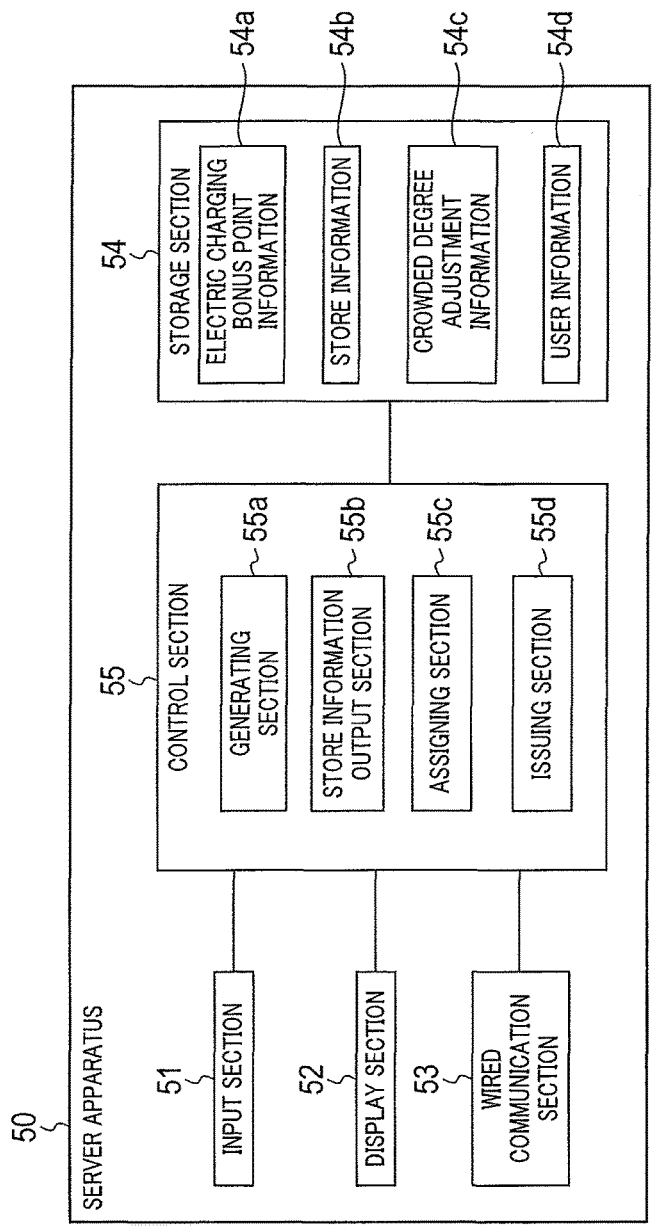
FIG. 6 is a block diagram illustrating an exemplary configuration of a server apparatus.

FIG. 6 is a block diagram illustrating an exemplary configuration of server apparatus 50. Server apparatus 50 includes input section 51, display section 52, wired communication section 53, storage section 54 and control section 55.

Input section 51 is an input device such as a keyboard. Display section 52 is a display device such as a liquid crystal display. Wired communication section 53 is a processing section which communicates with other apparatuses via network 70.

Storage section 54 is a storage device such as a memory and a hard disk apparatus. Storage section 54 stores electric charging bonus point information 54a, store information 54b, crowded degree adjustment information 54c, user information 54d, or the like.

Electric charging bonus point information 54a is information of an electric charging bonus point (electric charging parameter) provided to a customer according to a purchase amount of a product or service. The electric charging bonus point is converted into an electric charging period, and electric charging can be performed from receptacle 40 for the electric charging period. It should be noted that while the electric charging bonus point is converted into an electric charging period, the electric charging bonus point may be converted into an electric charge amount (for example, ampere-hour).

FIG. 7 illustrates an example of electric charging bonus point information 54a. Electric charging bonus point information 54a includes information of day of the week, a time slot, an electric charging bonus point and a specific electric charging bonus point.

As illustrated in FIG. 7, an electric charging bonus point per 100 yen provided to the customer who purchases a product or service varies according to day of the week and a time slot. For example, in the example of FIG. 7, less electric charging bonus points are provided in day of the week and time slots when the store is crowded, while more electric charging bonus points are provided in day of the week and time slots when the store is relatively not crowded. It is thereby possible to encourage the customer to visit the store when the store is not crowded.

Further, the specific electric charging bonus point is an electric charging bonus point provided to the customer who purchases a specific product or service. In the example of FIG. 7, twice as many points as normal electric charging bonus points are provided as the specific electric charging bonus point. Because the customer can get twice as many points as normal by purchasing a specific product or service, it is possible to encourage the customer to purchase the specific product or service.

Further, store information 54b illustrated in FIG. 6 is information relating to a store to be utilized by the customer. FIG. 8 illustrates an example of store information 54b. Store information 54b includes information of a store ID, the total number of receptacles, the number of receptacles being used, a crowded degree, a lowest electricity expense time slot and location information.

The store ID is identification information for identifying a store. The total number of receptacles is the total number of receptacles which can be utilized to charge up information equipment 30. The number of receptacles being used is the number of receptacles which are being used to charge up information equipment 30 at that time.

The crowded degree is information indicating a crowded degree of the store. The crowded degree is a ratio of the number of receptacles being used with respect to the total number of receptacles. It should be noted that while the crowded degree is determined in this manner here, the crowded degree is not limited to this. For example, when there are seats equipped with receptacles and seats not equipped with receptacles in the store, the crowded degree may be an occupancy ratio of the seats equipped with receptacles.

For example, it is also possible to shoot inside of the store with a camera and determine the crowded degree of the store by detecting the number of people by way of image analysis, or it is also possible to determine the crowded degree of the store by the number of times purchase information of a customer is input to register 20 in a given period of time. Further, it is also possible to determine the crowded degree of the store from the number of times an entrance door opens in a given period of time.

The lowest electricity expense time slot is information of a time slot during which electricity expense is the lowest. Because in this time slot, an electric charging bonus point is converted into a longer electric charging period than that in other time slots, it is possible to make electric charging bonus points less consumed when electric charging is performed in this time slot.

The location information is information of location of the store. This location information is, for example, comprised of a combination of the latitude and the longitude. In the example of FIG. 8, information of the latitude of "35.65 . . . " and the longitude of "139.74 . . . " is registered as location information of the store having a store ID of "1001." This location information is used when the customer searches for the nearest store.

Further, crowded degree adjustment information 54c illustrated in FIG. 6 is information used for adjusting an electric charging bonus point to be provided to the customer according to the crowded degree of the store. FIG. 9 illustrates an example of crowded degree adjustment information 54c. Crowded degree adjustment information 54c includes a crowded degree and information of magnification.

The crowded degree is the same information as the crowded degree in store information 54b illustrated in FIG. 8. The magnification is information of a numerical value by which an electric charging bonus point is multiplied according to the crowded degree of the store. For example, in the example of electric charging bonus point information 54a illustrated in FIG. 7, an electric charging bonus point on "Sunday" and in a time slot of "10:00-14:00" is "100" per 100 yen.

Therefore, when the customer visits the store at 11:00 am on Sunday and purchases a product which is not a specific product at 1,000 yen, an electric charging bonus point to be provided to the customer is 1,000 points. This electric charging bonus point is adjusted based on crowded degree adjustment information 54c illustrated in FIG. 9.

Specifically, when the crowded degree is "lower than 25%," the electric charging bonus point to be provided is doubled, and 2,000 points are provided to the customer. Further, when the crowded degree is "25% or higher and less than 50%", the electric charging bonus point to be provided is multiplied by 1.5, and 1,500 points are provided to the customer. When the crowded degree is "50% or higher and lower than 75%," 1,000 points are provided to the customer. Further, when the crowded degree is "75% or higher," the electric charging bonus point to be provided is multiplied by 0.5, and 500 points are provided to the customer.

In this example, more electric charging bonus points are provided to the customer when the store is not crowded, while less electric charging bonus points are provided to the customer when the store is crowded. It is therefore possible to encourage the customer to visit the store when the store is not crowded.

User information 54d illustrated in FIG. 6 is information of the customer who utilizes the electric charging system. FIG. 10 illustrates an example of user information 54d. User information 54d includes information of a user ID, an accumulated electric charging bonus point, a membership flag, a possessed product, a last visit store ID, a spending period and an electric charging flag.

The user ID is the same information as user ID 34a described with reference to FIG. 4. The accumulated electric charging bonus point is a value obtained by subtracting a value corresponding to points used by the customer to charge up information equipment 30 from an accumulation value of an electric charging bonus point provided to the customer until then every time the customer purchases a product or service. For example, when the accumulation value of the point provided to the customer until then is 300, if the customer charges up information equipment 30 for 15 minutes, the electric charging bonus point decreases by 100 points and the accumulated electric charging bonus point becomes 200.

The membership flag is a flag indicating whether or not the customer is a member of a predetermined club. The predetermined club is, for example, a fan club of a product of the company. If the customer is a member of the predetermined club, a conversion ratio between the electric charging bonus point and the electric charging period is changed.

For example, while the customer who is not a member of the predetermined club can be allowed for electric charging for 15 minutes with 100 points, if he is a member of the predetermined club, the conversion ratio is changed so that the customer can be allowed for electric charging for 20 minutes with 100 points. Alternatively, it is also possible to add extra predetermined points (for example, 50 points) to the electric charging bonus point provided to the customer who is a member of the predetermined club. By this means, it is possible to encourage the customer to register as a member of the predetermined club.

The possessed product is information of a product possessed by the customer. This product is, for example, a product of the company relating to the above-described fan club. For example, the customer can register the possessed product through the website on the Internet. The information registered through the website is also registered in user information 54d.

The information of the possessed product is used when the electric charging bonus point is provided to the customer. Specifically, the conversion ratio between the electric charging bonus point and the electric charging period is changed according to the number of possessed products.

For example, while the customer who does not possess any product can be allowed for electric charging for 15 minutes with 100 points, if the number of possessed products is A (A is an integer of one or more), the conversion ratio is changed so that the customer can be allowed for electric charging for (15+5×A) minutes with 100 points.

Alternatively, it is also possible to add extra predetermined points (for example, 50 points) per product to the electric charging bonus point provided to the customer. By this means, it is possible to encourage the customer to purchase products.

It is also possible to further take into account information of a usage state of the possessed product. For example, it is also possible to make server apparatus 50 collect information of frequency of usage of a product connected to a network in a given period of time, and change the conversion ratio between the electric charging bonus point and the electric charging period if the frequency of usage exceeds a predetermined threshold.

For example, while the customer can be allowed for electric charging for 15 minutes with 100 points if the frequency of usage does not exceed the predetermined threshold, the conversion ratio is changed so that the customer can be allowed for electric charging for 20 minutes with 100 points if the frequency of usage exceeds the predetermined threshold. Alternatively, it is also possible to add extra predetermined points (for example, 50 points) to the electric charging bonus point provided to the customer if the frequency of usage exceeds the predetermined threshold. It is thereby possible to encourage the customer to use the product.

Returning to FIG. 10, the last visit store ID is information indicating a store ID of a store where the customer charges up information equipment 30 last time. When the customer purchases a product or service at the store, the information of the store ID of the store where the customer purchases the product or service is transmitted from information equipment 30 to server apparatus 50 along with information of the purchase amount. The store ID received last time from information equipment 30 is registered as the last visit store ID.

This last visit store ID is used to specify the store when the customer left information equipment 30 at the store. Specifically, if the customer accesses a predetermined website using a personal computer, or the like, information such as address and phone number of the store corresponding to the last visit store ID is displayed. By this means, the customer can easily specify the place where he left information equipment 30.

The spending period is information of a period the customer will stay at the store. Information of the starting point of the spending period (for example, "21:04" when the spending period is "21:04-23:00") is information of time transmitted from information equipment 30 to server apparatus 50 when the customer purchases a product or service. If the customer does not purchase a product or service, the information of the spending period is not registered.

Information of the end point of the spending period (for example, "23:00" when the spending period is "21:04-23:00") is input by the customer using information equipment 30 and transmitted to server apparatus 50. Here, if there is no input by the customer, the information of the end point of the spending period is not registered (for example, as illustrated in FIG. 10, only the information of the starting point is registered as "20:48-").

The information of the spending period is utilized so that electric charging is performed in a time slot in which electricity expense is the lowest. For example, when the customer inputs the information of the end point of the spending period, information of a lowest electricity expense time slot at the store where the customer stays is searched from store information 54b illustrated in FIG. 8. Then, it is determined whether the spending period of the customer overlaps with the lowest electricity expense time slot of the store, and if the spending period overlaps with the lowest electricity expense time slot, the electric charging period is set so that electric charging can be performed in a time slot in which the spending period overlaps with the lowest electricity expense time slot.

For example, when the spending period of the customer is "21:04-23:00" and the lowest electricity expense time slot of the store is "22:00-7:00," because the spending period overlaps with the lowest electricity expense time slot during "22:00-23:00," the electric charging period is set so that electric charging is performed in this time slot.

Returning to FIG. 10, the electric charging flag is a flag indicating whether or not information equipment 30 is charged up at that time. By collecting the number of information equipment 30 being charged up for each store using information of this electric charging flag, it is possible to calculate the number of receptacles being used in each store in store information 54b illustrated in FIG. 8.

Returning to FIG. 6, control section 55 is a control device such as a processor, which controls each section of server apparatus 50. Control section 55 includes generating section 55a, store information output section 55b, assigning section 55c and issuing section 55d.

Generating section 55a is a processing section which generates electric charging information indicating an electric charging period during which a receptacle performs electric charging. Specifically, generating section 55a acquires the purchase amount information and the information of the user ID transmitted from information equipment 30. Generating section 55a then reads out an electric charging bonus point corresponding to day of the week and the time slot from electric charging bonus point information 54a illustrated as an example in FIG. 7.

It should be noted that to encourage the customer to purchase a specific product or specific service, generating section 55a further acquires specific product and service information transmitted from information equipment 30.

This specific product and service information is information indicating whether or not the customer has purchased a specific product or service. In this case, generating section 55a reads out a specific electric charging bonus point corresponding to day of the week and the time slot from electric charging bonus point information 54a illustrated as an example in FIG. 7.

Further, generating section 55a adjusts an electric charging bonus point to be provided to the customer according to a crowded degree of the store. Specifically, generating section 55a generates information of the crowded degree in store information 54b illustrated as an example in FIG. 8. Generating section 55a then reads out information of magnification according to the crowded degree from crowded degree adjustment information 54c illustrated as an example in FIG. 9.

Subsequently, generating section 55a multiplies the electric charging bonus point read from electric charging bonus point information 54a illustrated as an example in FIG. 7 by the magnification. Generating section 55a adds the electric charging bonus point obtained in this manner to the accumulated electric charging bonus point of electric charging bonus point information 54a illustrated as an example in FIG. 10. Generating section 55a then updates the information of the accumulated electric charging bonus point of electric charging bonus point information 54a with the accumulated electric charging bonus point obtained as a result of the addition.

Further, generating section 55a converts the accumulated electric charging bonus point into an electric charging period using a predefined conversion ratio between the accumulated electric charging bonus point and the electric charging period. For example, generating section 55a converts the accumulated electric charging bonus point of 100 into the electric charging period of 15 minutes.

At that time, generating section 55a determines whether or not the customer is a member of a predetermined club with reference to the membership flag information of user information 54d illustrated as an example in FIG. 10. If the customer is a member of the predetermined club, generating section 55a changes the above conversion ratio and converts the accumulated electric charging bonus point into the electric charging period using the changed conversion ratio. For example, generating section 55a converts the accumulated electric charging bonus point of 100 into the electric charging period of 20 minutes.

Further, generating section 55a determines whether or not the customer possesses a product of a predetermined company, or the like, with reference to information of the possessed product of user information 54d illustrated as an example in FIG. 10. If the customer possesses the product, generating section 55a changes the above conversion ratio according to the number of products and converts the accumulated electric charging bonus point into the electric charging period using the changed conversion ratio.

For example, when the number of possessed products is A (A is an integer of one or more), generating section 55a changes the conversion ratio so as to allow electric charging for (15+5×A) minutes with the accumulated electric charging bonus point of 100.

Further, the server apparatus may collect information of frequency of usage of a product for a certain period, and if the frequency of usage exceeds a predetermined threshold, generating section 55a may change the conversion ratio between the accumulated electric charging bonus point and the electric charging period. For example, if the frequency of usage exceeds the predetermined threshold, generating section 55a changes the conversion ratio so as to allow electric charging for 20 minutes with the accumulated electric charging bonus point of 100.

Generating section 55a converts the accumulated electric charging bonus point into the electric charging period using the conversion ratio changed as described above.

Further, when the customer inputs information of the spending period during which he will stay at the store using information equipment 30, generating section 55a searches for information of the lowest electricity expense time slot of the store where the customer stays from store information 54b illustrated as an example in FIG. 8.

Generating section 55a then determines whether or not the spending period of the customer overlaps with the lowest electricity expense time slot of the store, and, if the spending period overlaps with the lowest electricity expense time slot, sets the electric charging period so that electric charging can be performed in a time slot during which the spending period overlaps with the lowest expense time slot.

For example, if the spending period of the customer is "21:04-23:00" and the lowest electricity expense time slot of the store is "22:00-7:00," generating section 55a sets the electric charging period so that electric charging is performed in a time slot of "22:00-23:00."

After the above-described processing, generating section 55a generates electric charging information indicating the electric charging period. It should be noted that if the spending period of the customer overlaps with the lowest electricity expense time slot of the store, the electric charging information includes information of the time slot which is set so that electric charging is performed in the lowest electricity expense time slot. This electric charging information is used by receptacle 40 to control the electric charging period of information equipment 30.

Further, while the electric charging period is provided to the customer according to the accumulated electric charging bonus point, it is also possible to provide a predetermined electric charging period to the customer for free regardless of the accumulated electric charging bonus point. By this means, it is possible for the store to draw more customers.

However, if the crowded degree of the store becomes equal to or greater than a predetermined threshold, it is also possible to make generating section 55a shorten a free electric charging period. By this means, it is possible to provide electric charging service to more customers.

Further, generating section 55a determines whether or not the accumulated electric charging bonus point registered in user information 54d illustrated as an example in FIG. 10 is equal to or less than a predetermined value. If the accumulated electric charging bonus point becomes equal to or less than the predetermined value, generating section 55a generates information for recommending that the customer purchase a product or service and encouraging the customer to get the accumulated electric charging bonus point. This information is transmitted to information equipment 30 by wired communication section 53 and displayed on information equipment 30. By this means, it is possible to prevent situation where electric charging becomes suddenly impossible.

Store information output section 55b is a processing section which outputs information of a last visit store ID for specifying a store where the customer has purchased a product or service last time. This information is transmitted to a web server apparatus which provides a predetermined website, by wired communication section 53. When the customer accesses this website using a personal computer, or the like, information such as address and phone number of the store is displayed.

Assigning section 55c is a processing section which assigns an electric charging period to a person different from the customer who has purchased a product or service. Specifically, when wired communication section 53 receives a command for providing an electric charging bonus point from information equipment 30 of the customer who has purchased a product or service to another person, assigning section 55c assigns a point designated by the customer among the accumulated electric charging bonus point of user information 54d illustrated as an example in FIG. 10 to another user.

By assigning an electric charging bonus point to another user in this manner, it is possible to induce another user to visit the store or encourage another user to be a member of a fan club of a product of the company.

Issuing section 55d is a processing section which searches for a store whose crowded degree is equal to or lower than a predetermined level within certain distance from the designated store and issues a coupon which can be used at the store whose crowded degree is equal to or lower than the predetermined level.

For example, when the customer designates a certain store in a predetermined website, issuing section 55d receives information of a store ID of the designated store from a web server apparatus which provides the website via wired communication section 53.

Issuing section 55d then searches for a store whose crowded degree is equal to or less than the predetermined value within certain distance from the designated store with reference to the information of the crowded degree and the location information of store information 54b illustrated as an example in FIG. 8.

Subsequently, issuing section 55d transmits information of the store ID of the searched store to the web server apparatus which provides the above-described website via wired communication section 53. The web server apparatus which receives this information displays the information of the store on the website. By this means, the user can easily know a nearby store which is not crowded.

Further, issuing section 55d transmits information of a coupon which can be utilized at the store to information equipment 30 of the customer via wired communication section 53. This coupon provides some kind of specific benefits to the customer. For example, this coupon provides free electric charging service for 15 minutes to the user.

For example, when the customer presents the information of this coupon to a store clerk at the searched store, the store clerk operates register 20 to embed the information in purchase amount information 25a illustrated in FIG. 3 to be transmitted to server apparatus 50. Here, the information of the coupon is, for example, information indicating that free electric charging service for 15 minutes is provided to the customer. Purchase amount information 25a is transmitted to server apparatus 50 via information equipment 30.

It should be noted that while the store clerk embeds the information of the coupon in purchase amount information 25a here, if radio communication section 33 of information equipment 30 receives purchase amount information 25a from register 20, control section 35 of information equipment 30 may embed the information of the coupon in purchase amount information 25a.

Generating section 55a of server apparatus 50 which receives this information generates electric charging information indicating an electric charging period which has been extended by 15 minutes and transmits the electric charging information to information equipment 30. This electric charging information is forwarded from information equipment 30 to receptacle 40, and information equipment 30 is charged up for an electric charging period included in the electric charging information.

In this way, by providing a coupon to the customer as well as by providing information of a store which is not crowded to the customer, it is possible to effectively induce the customer to visit a store which is not relatively crowded instead of visiting a crowded store.

It should be noted that the above-mentioned coupon may be changed, for example, according to a remaining battery level of information equipment 30. This example (hereinafter, referred to as specific example 1) will be described. When receiving remaining battery level information from information equipment 30 via wired communication section 53, issuing section 55d compares a remaining battery level of information equipment 30 indicated in the information with threshold A which is set in advance. As a result of this comparison, if the remaining battery level is greater than threshold A, issuing section 55d determines the information of the coupon so that electric charging service for a predefined first period (for example, 15 minutes as described above) is provided. On the other hand, as a result of the above comparison, if the remaining battery level is equal to or less than threshold A, issuing section 55d determines the information of the coupon so that a predefined second period (a period longer than the first period, for example, 30 minutes) is provided. In this way, issuing section 55d determines the information of the coupon so that electric charging service is provided for a longer period when the remaining battery level is less and determines the information of the coupon so that the electric charging service is provided for a shorter period when the remaining battery level is greater.

Alternatively, the above-mentioned coupon may be changed, for example, according to distance between current location of information equipment 30 and location of the store (store searched by issuing section 55d). This example (hereinafter, referred to as specific example 2) will be described. When receiving current location information from information equipment 30 via wired communication section 53, issuing section 55d calculates distance (hereinafter, referred to as travel distance) from the current location of information equipment 30 indicated in the information to the location of the store. Then, issuing section 55d compares the travel distance with threshold B which is set in advance. As a result of this comparison, if the travel distance is equal to or less than threshold B, issuing section 55d determines the information of the coupon so that electric charging service for a predefined first period (for example, 15 minutes as described above) is provided. On the other hand, as a result of the above comparison, if the travel distance is greater than threshold B, issuing section 55d determines the information of the coupon so that electric charging service for a predefined second period (period longer than the first period, for example 30 minutes) is provided. In this way, issuing section 55d determines the information of the coupon so that electric charging service is provided for a longer period if the travel distance is longer, and determines the information of the coupon so that electric charging service is provided for a shorter period if the travel distance is shorter.

Alternatively, the above-described specific example 1 and specific example 2 may be combined. Specifically, the above-mentioned coupon may be changed according to the remaining battery level and the travel distance. This example (hereinafter, referred to as specific example 3) will be described. Issuing section 55d compares the remaining battery level with threshold A as described in the above specific example 1 and compares the travel distance with threshold B as described in the above specific example 2. As a result of these comparison, if the remaining battery level is equal to or less than threshold A and the travel distance is greater than threshold B, issuing section 55d determines that electric charging service is provided for a first period (longer than a second period which will be described later). Further, as a result of the above-described comparison, if the remaining battery level is equal to or less than threshold A and the travel distance is equal to or less than threshold B, issuing section 55d determines that electric charging service is provided for a second period (shorter than the first period). Further, as a result of the above-described comparison, if the remaining battery level is greater than threshold A and the travel distance is greater than threshold B, issuing section 55d determines that electric charging service is provided for a third period (shorter than the second period). Still further, as a result of the above-described comparison, if the remaining battery level is greater than threshold A and the travel distance is equal to or less than threshold B, issuing section 55d determines that electric charging service is provided for a fourth period (shorter than the third period). In this way, issuing section 55d determines the information of the coupon so that electric charging service is provided for the longest period when the remaining battery level is less and the travel distance is longer, and determines the information of the coupon so that electric charging service is provided for the shortest period when the remaining battery level is greater and the travel distance is shorter.

It should be noted that while, in the above-described each specific example, one threshold is used for comparison of the remaining battery level, and one threshold is used for comparison of the travel distance, it is also possible to perform each comparison using two or more thresholds and determine a period for providing electric charging service according to each result of comparison.

Further, while in the above-described specific examples, the remaining battery level and/or the travel distance are compared with the thresholds, it is also possible to determine a period for providing electric charging service without using thresholds. For example, issuing section 55d may determine the period for providing electric charging service based on the remaining battery level indicated in the remaining battery level information and an information table in which a period for providing electric charging service is defined for each remaining battery level. Further, for example, issuing section 55d may calculate travel distance based on the current location information and the location information of the store and may determine a period for providing electric charging service based on the travel distance and an information table in which a period for providing electric charging service is defined for each travel distance.

Further, while in the above-described each specific example, a period for providing electric charging service is determined as the content of the coupon, an electric charging bonus point to be provided to the user may be determined as the content of the coupon.

In this way, according to the above-described specific examples 1 to 3, by changing the information of the coupon according to at least one of the remaining battery level and the travel distance, it is possible to more effectively induce the customer to visit the store.

Figure 11:
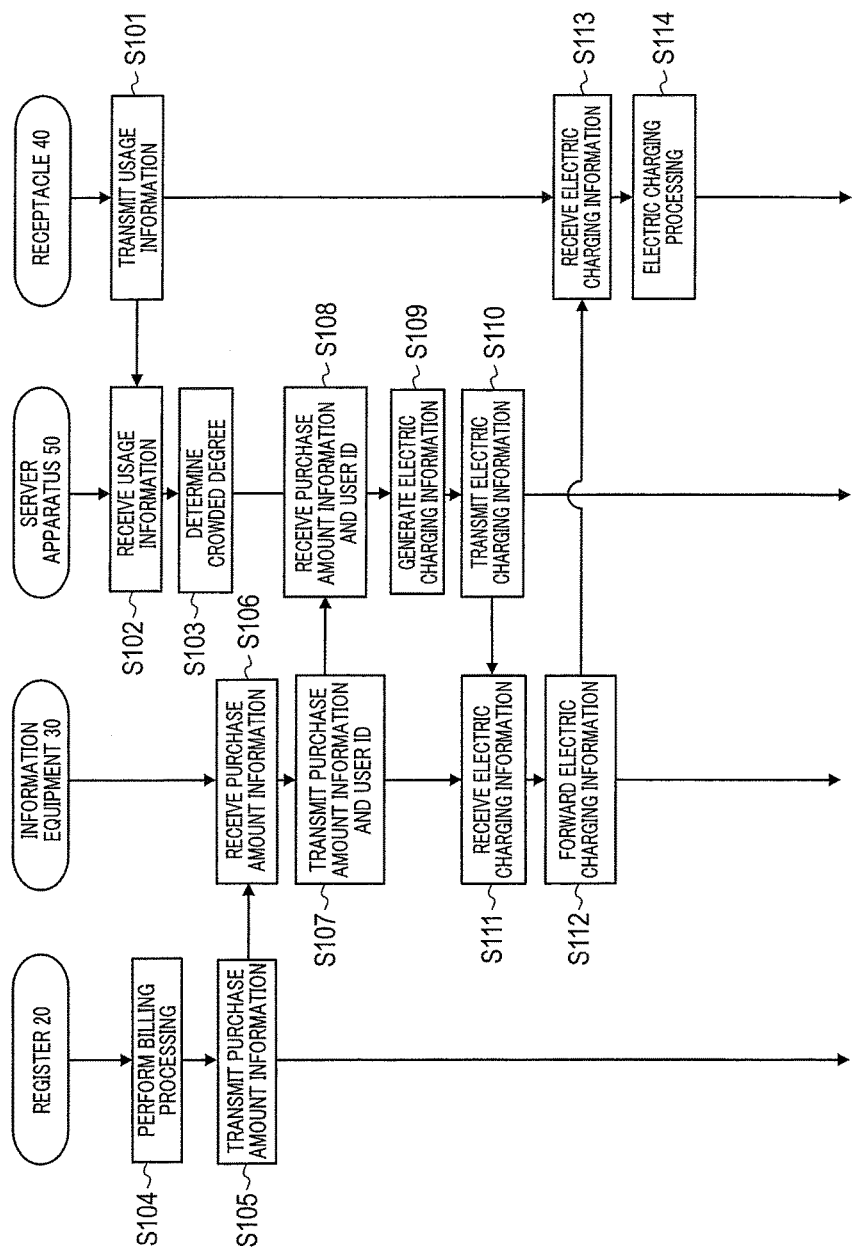
FIG. 11 is a sequence diagram illustrating exemplary processing procedure of electric charging processing in Embodiment 1 of the present invention.

An example of the processing procedure of the electric charging processing according to Embodiment 1 of the present invention will now be described. FIG. 11 is a sequence diagram illustrating an example of the processing procedure of the electric charging processing according to Embodiment 1 of the present invention.

Receptacle 40 provided at the store transmits usage information to server apparatus 50 (step S101). The usage information is information indicating whether or not receptacle 40 is being used to charge up information equipment 30. Server apparatus 50 then receives the usage information (step S102). The number of receptacles being used of store information 54b illustrated as an example in FIG. 8 is calculated from this usage information.

Subsequently, server apparatus 50 determines the crowded degree of the store (step S103). Specifically, server apparatus 50 determines the crowded degree from the total number of receptacles and the number of receptacles being used of store information 54b.

Meanwhile, when the customer purchases a product or service, register 20 executes billing processing (step S104). For example, register 20 receives input of a product or service and an amount and receives payment with electronic money from information equipment 30.

Register 20 then transmits information of a purchase amount of the product or the service to information equipment 30 (step S105). This information includes information of a store ID for identifying the store and information of time. Information equipment 30 receives this information (step S106).

Information equipment 30 which receives the information of the purchase amount, transmits the information of the user ID to server apparatus 50 along with the information of the purchase amount (step S107). Server apparatus 50 receives the information of the purchase amount and the information of the user ID (step S108).

Subsequently, server apparatus 50 generates electric charging information indicating an electric charging period using the information of the crowded degree, or the like, as described above (step S109). Server apparatus 50 then transmits the electric charging information to information equipment 30 (step S110).

Information equipment 30 receives the electric charging information transmitted from server apparatus 50 (step S111) and forwards the information to receptacle 40 (step S112). The receptacle 40 then receives the electric charging information (step S113) and charges up information equipment 30 only for an electric charging period included in the electric charging information (step S114).

Figure 12A:
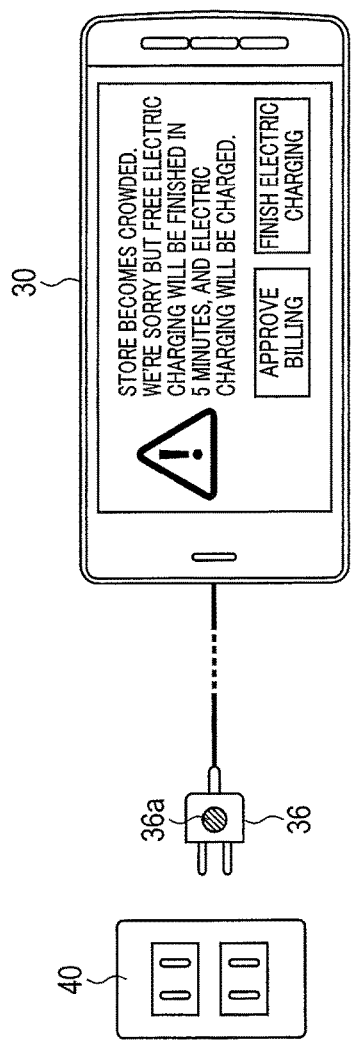
FIGS. 12A, 12B and 12C illustrate billing processing when a store is crowded.
Figure 12B:
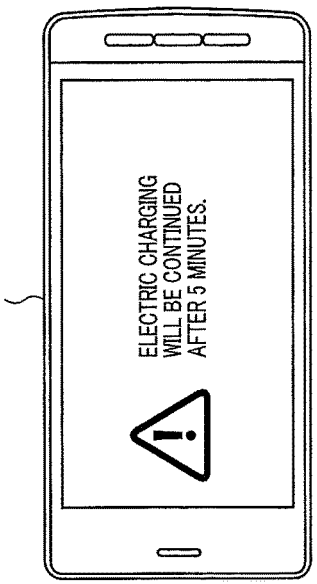
Figure 12C:
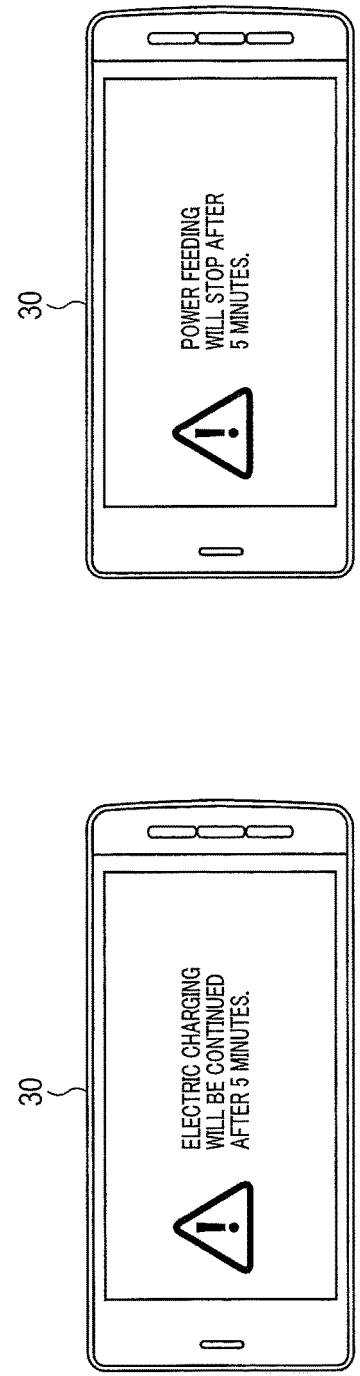
Figure 13:
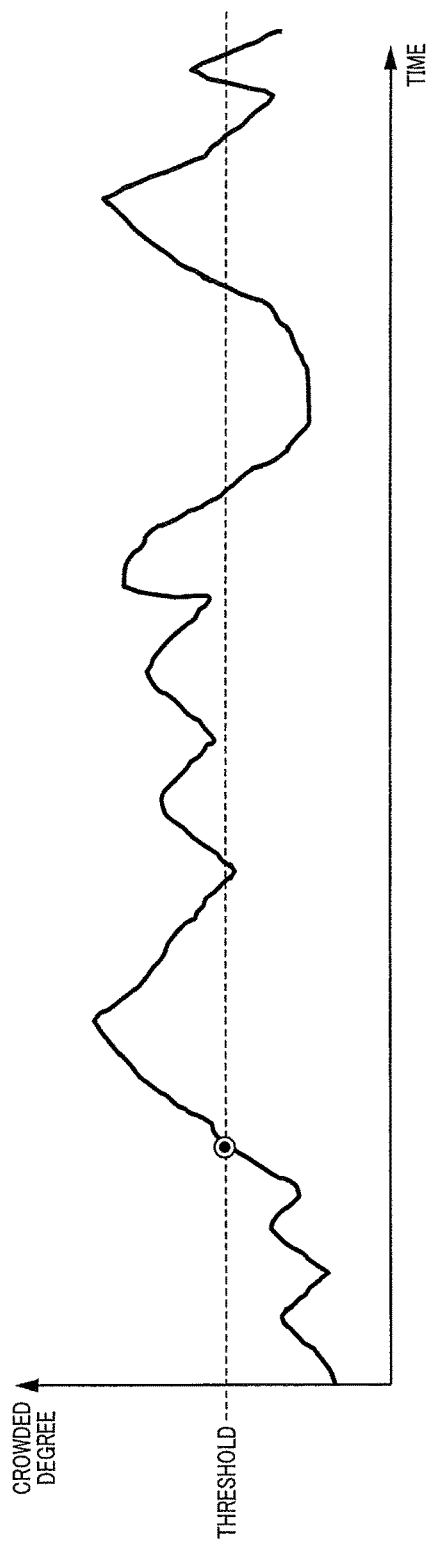
FIG. 13 illustrates a relationship between change of a crowded degree and a predetermined threshold.

An example of the processing procedure of billing processing when the store is crowded will now be described. FIGS. 12A to 12C illustrate billing processing when the store is crowded. FIG. 13 illustrates a relationship between change of the crowded degree and a predetermined threshold.

It is assumed that, in this electric charging service, for example, electric charging is allowed for 15 minutes for free regardless of the accumulated electric charging bonus point. However, as illustrated in FIG. 13, if the crowded degree of the store exceeds a predetermined threshold, this electric charging period is shortened.

FIG. 12A illustrates an exemplary screen displayed on information equipment 30 when a free electric charging period is shortened to 5 minutes to go because the crowded degree of the store exceeds the predetermined threshold. On this screen, an "Approve Billing" button and a "Finish Electric Charging" button are displayed. If this display is shown, it is controlled that LED (Light Emitting Diode) 36a provided at plug 36 of information equipment 30 blinks.

When the user selects the "Approve Billing" button, the electric charging period is extended, and as illustrated in FIG. 12B, a message for notifying the customer that the electric charging period has been extended is displayed on information equipment 30. In this case, as described above, the accumulated electric charging bonus point registered in user information 54d illustrated as an example in FIG. 10 decreases according to the electric charging period.

Meanwhile, when the user selects the "Finish Electric Charging" button, electric charging processing for information equipment 30 is stopped, and, as illustrated in FIG. 12C, a message for notifying the customer that the electric charging processing is stopped is displayed on information equipment 30.

Figure 14:
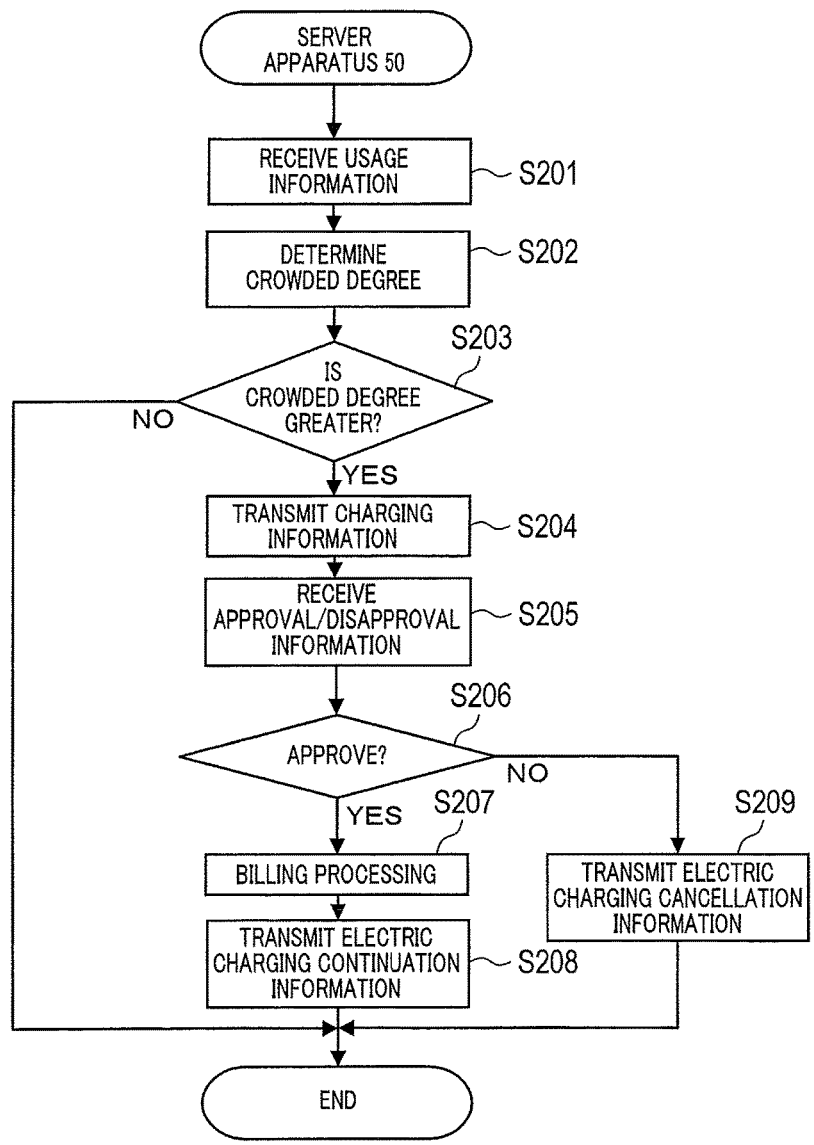
FIG. 14 is a flowchart illustrating exemplary processing procedure of billing processing when the store is crowded.

FIG. 14 is a flowchart illustrating an example of the processing procedure of billing processing when the store is crowded. This processing is performed by server apparatus 50.

First, server apparatus 50 receives the usage information from receptacle 40 (step S201). Server apparatus 50 then determines the crowded degree of the store (step S202). If the crowded degree is not greater than a predetermined threshold (step S203: NO), processing from step S204 to step S209 is not executed.

If the crowded degree is greater than the predetermined threshold (step S203: YES), server apparatus 50 transmits billing information to information equipment 30 (step S204). The billing information is information for notifying the customer that a free electric charging period will end and inquiring as to whether or not the customer approves billing as illustrated in FIG. 12A.

It should be noted that this billing information includes control information for making LED 36a provided at plug 36 of information equipment 30 blink. As a result of LED 36a blinking with this control information, it is possible to reliably notify the user that a free electric charging period will end.

Subsequently, server apparatus 50 receives information as to whether or not the customer approves billing from information equipment 30 (step S205). If the customer approves billing (step S206: YES), server apparatus 50 executes billing processing (step S207). The billing processing is processing for converting the accumulated electric charging bonus point registered in user information 54d illustrated as an example in FIG. 10 into an electric charging period at a predetermined conversion ratio.

Server apparatus 50 then transmits electric charging continuation information including information of the electric charging period to information equipment 30 (step S208). This electric charging continuation information is forwarded from information equipment 30 to receptacle 40. Receptacle 40 charges up information equipment 30 only for an electric charging period included in the electric charging continuation information.

If the customer does not approve billing (step S206: NO), server apparatus 50 transmits electric charging cancellation information including information for instructing cancellation of electric charging to information equipment 30 (step S209). This electric charging cancellation information is forwarded from information equipment 30 to receptacle 40. Receptacle 40 cancels electric charging of information equipment 30 after a predetermined period has passed.

Figure 15A:
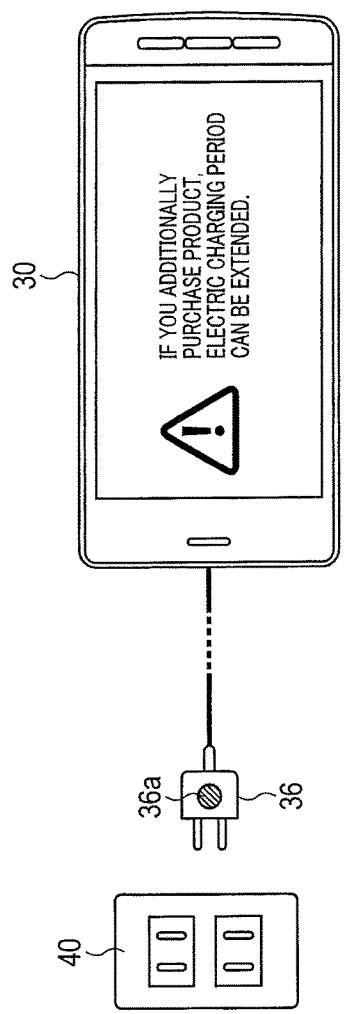
FIGS. 15A, 15B and 15C illustrate electric charging extension processing by additional purchase of a product or service.
Figure 15C:
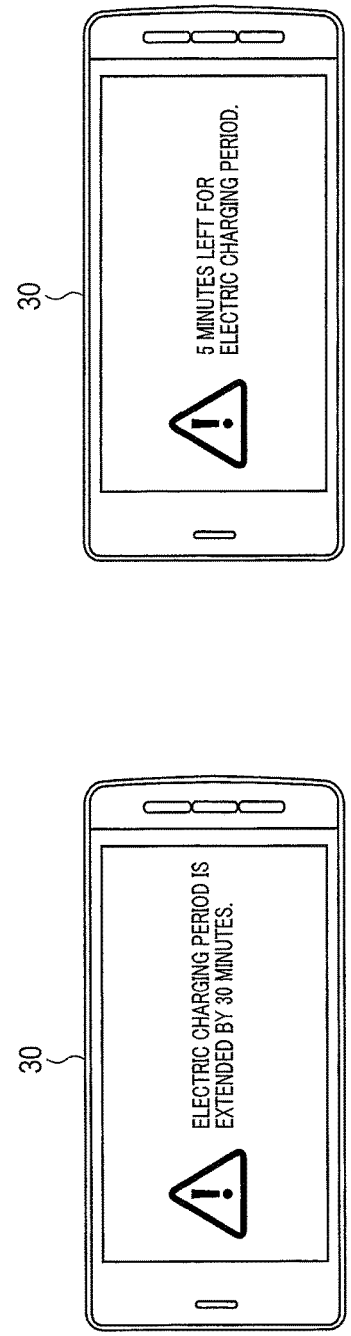
Figure 15B:
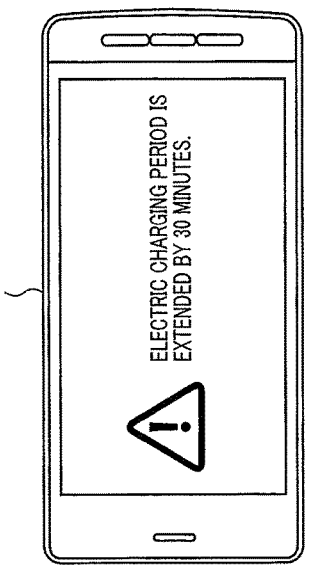

An example of the processing procedure of electric charging extension processing by additionally purchasing a product or service will now be described. FIGS. 15A to 15C illustrate electric charging extension processing performed when a product or service is additionally purchased. This electric charging extension processing is processing executed when the accumulated electric charging bonus point registered in user information 54d illustrated as an example in FIG. 10 is equal to or less than a predetermined value.

FIG. 15A illustrates an exemplary screen displayed on information equipment 30 when the accumulated electric charging bonus point is equal to or less than the predetermined value. In this exemplary screen, it is shown that the electric charging period can be extended if a product or service is additionally purchased. If this display is shown, it is controlled that LED 36a provided at plug 36 of information equipment 30 blinks.

If the customer additionally purchases a product or service, the electric charging period is extended, and, as illustrated in FIG. 15B, a message for notifying the customer that the electric charging period has been extended is displayed on information equipment 30. Meanwhile, if the customer does not additionally purchase a product or service, the electric charging period is not extended, and, as illustrated in FIG. 15C, a message for notifying the customer of the remaining electric charging period is displayed on information equipment 30.

Figure 16:
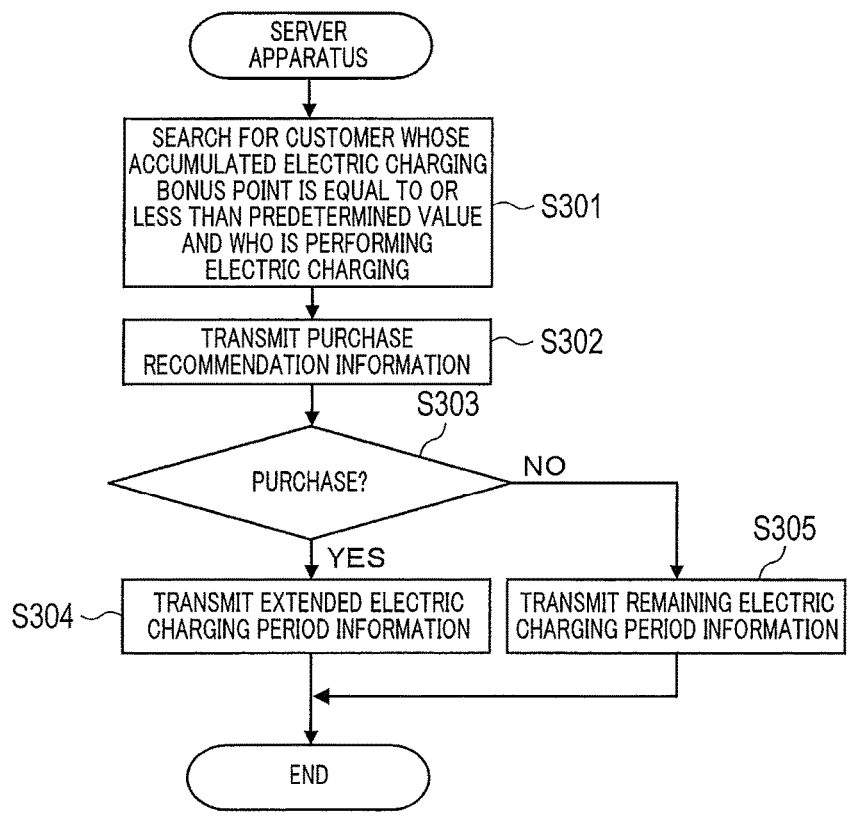
FIG. 16 is a flowchart illustrating exemplary processing procedure of the electric charging extension processing by additional purchase of a product or service.

FIG. 16 is a flowchart illustrating an example of processing procedure of electric charging extension processing when a product or service is additionally purchased. This processing is performed by server apparatus 50.

First, server apparatus 50 searches for a customer whose accumulated electric charging bonus point is equal to or less than a predetermined value and who is performing electric charging with reference to the accumulated electric charging bonus point and information of the electric charging flag of user information 54d illustrated as an example in FIG. 10 (step S301).

Server apparatus 50 transmits purchase recommendation information to information equipment 30 (step S302). The purchase recommendation information is information displayed on information equipment 30 to recommend that the searched customer purchase a product or service and to encourage the searched customer to get the accumulated electric charging bonus point as illustrated as an example in FIG. 15A.

Further, this purchase recommendation information includes control information for making LED 36a provided at plug 36 of information equipment 30 blink. As a result of LED 36a blinking with this control information, it is possible to reliably encourage the user to get the accumulated electric charging bonus point.

Server apparatus 50 then determines whether or not the customer has purchased a product or service based on information as to whether or not purchase amount information transmitted by information equipment 30 when the customer purchases a product or service is received (step S303).

If the customer purchases a product or service (step S303: YES), server apparatus 50 provides an electric charging bonus point to the customer and transmits information of the electric charging period after the electric charging period has been extended as illustrated in FIG. 15B to information equipment 30 (step S304). This information is then displayed on information equipment 30.

Meanwhile, if the customer does not purchase a product or service (step S303: NO), server apparatus 50 transmits information of the remaining electric charging period as illustrated in FIG. 15C to information equipment 30 (step S305). Then, this information is displayed on information equipment 30.

Embodiment 2

While in the above-described Embodiment 1, information equipment 30 transmits purchase amount information indicating an amount of a product or service purchased by the customer and information of the user ID for identifying the customer to server apparatus 50, a receptacle having a communication function may transmit these pieces of information to server apparatus 50. In Embodiment 2, such a case will be described.

Figure 17:
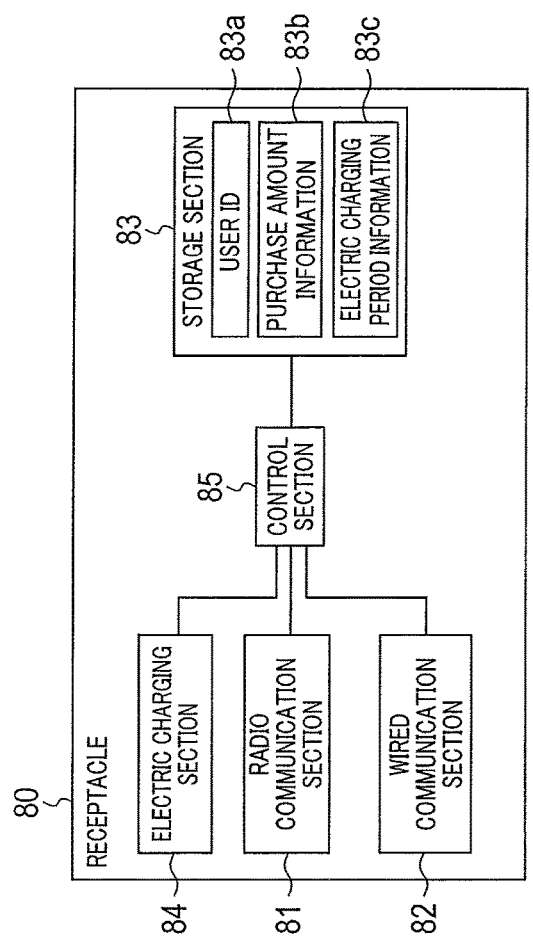
FIG. 17 is a block diagram illustrating an exemplary configuration of a receptacle according to Embodiment 2.

FIG. 17 is a block diagram illustrating an exemplary configuration of receptacle 80 according to Embodiment 2. Receptacle 80 is used in place of receptacle 40 illustrated in Embodiment 1. Receptacle 80 includes radio communication section 81, wired communication section 82, storage section 83, electric charging section 84 and control section 85.

Radio communication section 81 is a processing section which performs near-field radio communication with information equipment 30. Wired communication section 82 is a processing section which communicates with another apparatus such as server apparatus 50 via network 70.

Storage section 83 is a storage device such as a memory. Storage section 83 stores user ID 83a, purchase amount information 83b and electric charging period information 83c.

User ID 83a which is received from information equipment 30, is identification information for identifying a user of information equipment 30. This user ID 83a is the same information as user ID 34a described using FIG. 4.

Purchase amount information 83b which is also received from information equipment 30, is information of a purchase amount when the user purchases a product or service. This purchase amount information 83b is the same information as purchase amount information 34b described using FIG. 4.

Electric charging period information 83c is information of a period during which information equipment 30 can be charged up using receptacle 80. This electric charging period information 83c is information received from server apparatus 50.

Electric charging section 84 is a processing section which charges up information equipment 30, or the like. Electric charging section 84 reads out electric charging period information 83c from storage section 83 and charges up information equipment 30 only for a period designated by electric charging period information 83c. Control section 85 is a control device such as a processor, which controls each section of receptacle 80.

Figure 18:
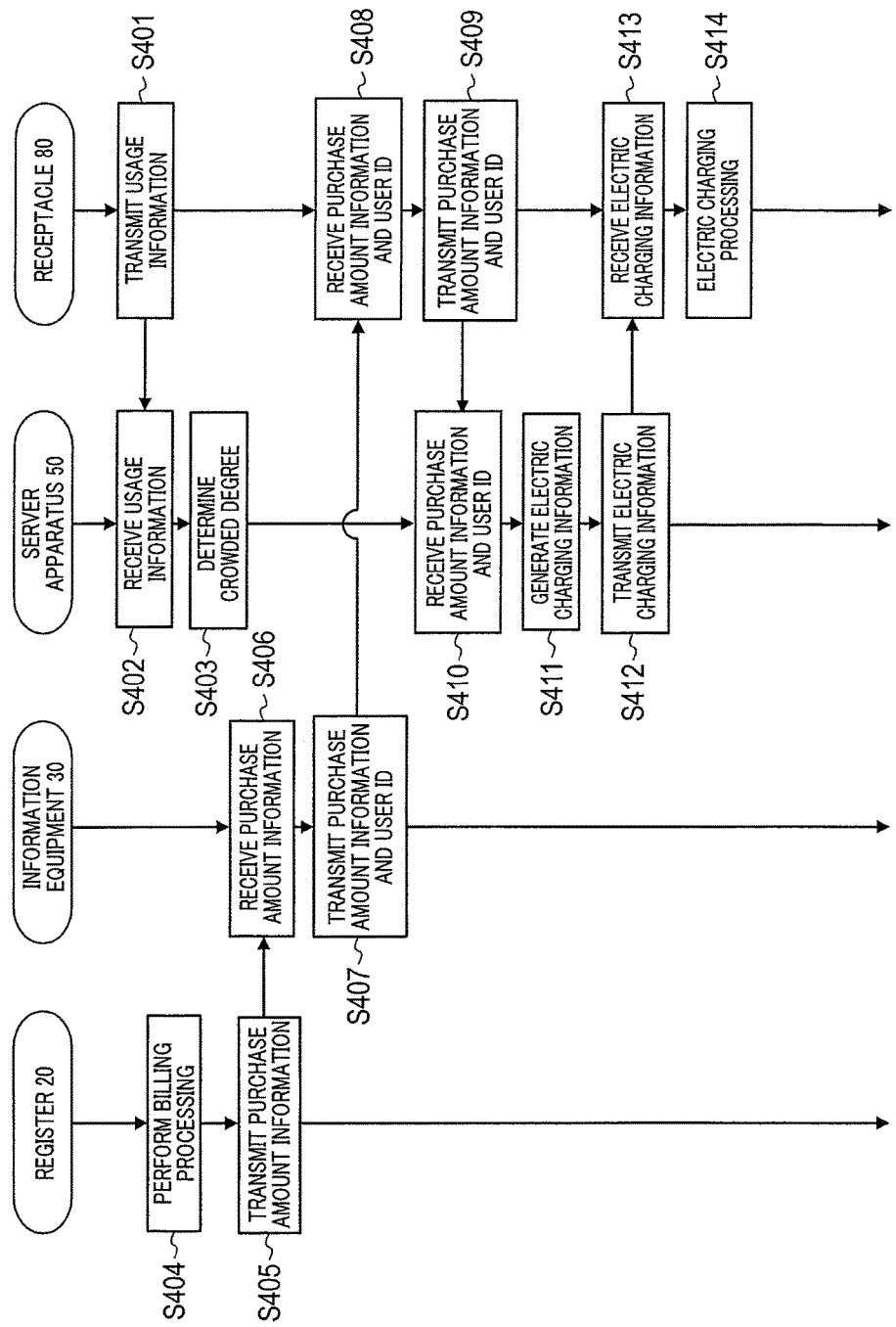
FIG. 18 is a sequence diagram illustrating exemplary processing procedure of electric charging processing in Embodiment 2 of the present invention.

An example of the processing procedure of electric charging processing according to Embodiment 2 of the present invention will now be described. FIG. 18 is a sequence diagram illustrating an example of the processing procedure of electric charging processing according to Embodiment 2 of the present invention.

Receptacle 80 provided at the store transmits usage information to server apparatus 50 (step S401). The usage information is information indicating whether or not receptacle 80 is being used to charge up information equipment 30. Server apparatus 50 then receives the usage information (step S402). The number of receptacles being used of store information 54b illustrated as an example in FIG. 8 is calculated from this usage information.

Server apparatus 50 then determines the crowded degree of the store (step S403). Specifically, server apparatus 50 determines the crowded degree from the total number of receptacles and the number of receptacles being used of store information 54b.

Meanwhile, when the customer purchases a product or service, register 20 executes billing processing (step S404). Specifically, register 20 receives input of a product or service and an amount and receives payment with electronic money from information equipment 30.

Register 20 then transmits information of a purchase amount of the product or the service to information equipment 30 (step S405). This information includes information of the store ID for identifying the store and information of time. Information equipment 30 receives this information (step S406).

Information equipment 30 which receives the information of the purchase amount transmits the information of the purchase amount and the information of the user ID to receptacle 80 using near-field radio communication when information equipment 30 is connected to receptacle 80 (step S407). Receptacle 80 receives these pieces of information (step S408).

Subsequently, receptacle 80 transmits the information of the purchase amount and the information of the user ID received from information equipment 30 to server apparatus 50 (step S409). Server apparatus 50 receives the information of the purchase amount and the information of the user ID (step S410).

Server apparatus 50 then generates electric charging information indicating an electric charging period using the information of the crowded degree, or the like, as described in Embodiment 1 (step S411). Server apparatus 50 then transmits the electric charging information to receptacle 80 (step S412).

Receptacle 80 receives the electric charging information transmitted from server apparatus 50 (step S413) and charges up information equipment 30 only for the electric charging period included in the electric charging information (step S414).

While the embodiments according to the present invention have been described in detail above with reference to the drawings, functions of the above-described register 20, information equipment 30, receptacles 40 and 80, server apparatus 50 and base station apparatus 60 can be implemented using a computer program.

Figure 19:
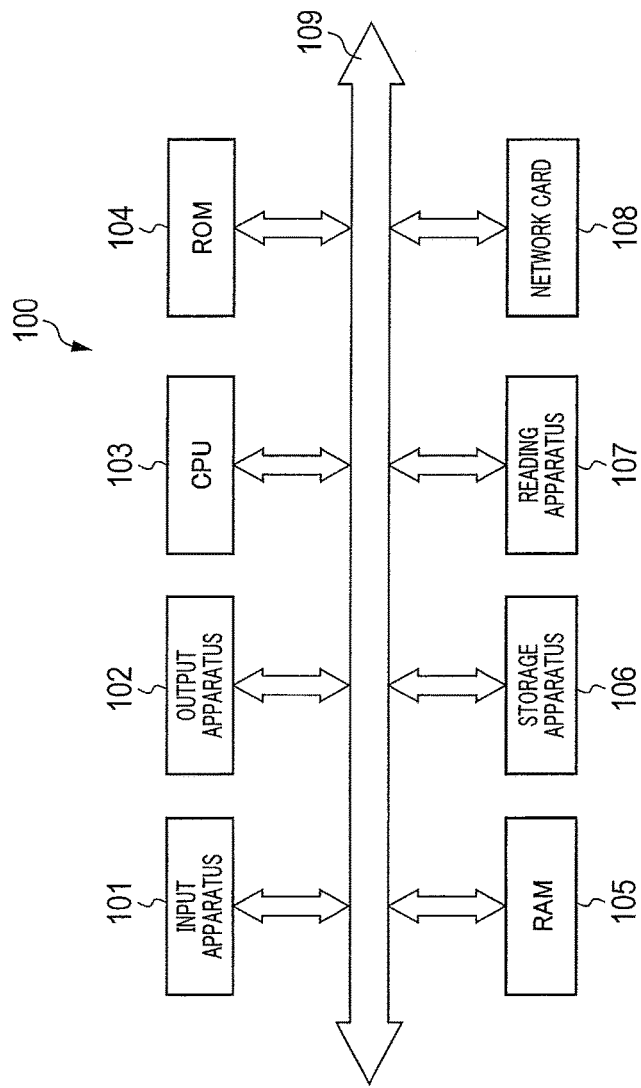
FIG. 19 illustrates a hardware structure of a computer which implements functions of the respective apparatuses using a program.

FIG. 19 illustrates a hardware structure of a computer which implements the functions of the apparatuses using a program.

This computer 100 includes input apparatus 101 such as a keyboard, a mouse, a touch pad and a button, output apparatus 102 such as a display and a speaker, CPU (Central Processing Unit) 103, ROM (Read Only Memory) 104 and RAM (Random Access Memory) 105. Computer 100 further includes storage apparatus 106 such as a hard disk apparatus and an SSD (Solid State Drive), reading apparatus 107 which reads information from a recording medium such as a DVD-ROM (Digital Versatile Disk Read Only Memory) and a USB (Universal Serial Bus) memory, and network card 108 which communicates via a network. The above-described sections are connected using bus 109.

Reading apparatus 107 then reads a program for implementing the functions of the above-described apparatuses from the recording medium in which the program is recorded and stores the program in storage apparatus 106. Alternatively, network card 108 communicates with the server apparatus connected to the network so that a program for implementing the functions of the above-described apparatuses downloaded from the server apparatus is stored in storage apparatus 106.

CPU 103 then copies the program stored in storage apparatus 106 to RAM 105 and sequentially reads out and executes commands included in the program from RAM 105, thereby implementing the functions of the above-described apparatuses.

Further, the technique described in the above-described embodiments can be implemented in a type, for example, a type of cloud service described below. However, the type in which the technique described in the above-described embodiments can be implemented is not limited to this.

(Service Type 1: Own Data Center Type)

Figure 20:
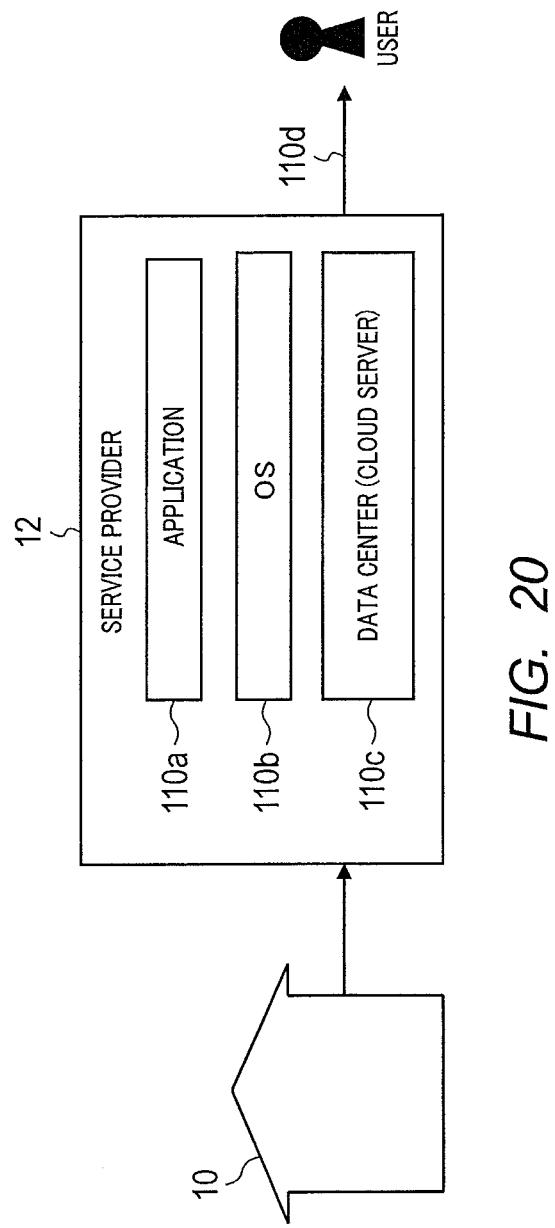
FIG. 20 illustrates service type 1 (own data center type)

FIG. 20 illustrates service type 1 (own data center type). This type is a type in which service provider 12 acquires information from group 10 and provides service to the user. In this type, service provider 12 has a function of data center operating company 11. Specifically, service provider 12 holds cloud server 11a which manages big data. Accordingly, data center operating company 11 does not exist.

In this type, service provider 12 operates and manages data center (cloud server 11a) (110c). Service provider 12 further manages OS (110b) and application (110a). Service provider 12 provides service using the OS (110b) and the application (110a) managed by service provider 12 (110d).

(Service Type 2: IaaS-Based Type)

Figure 21:
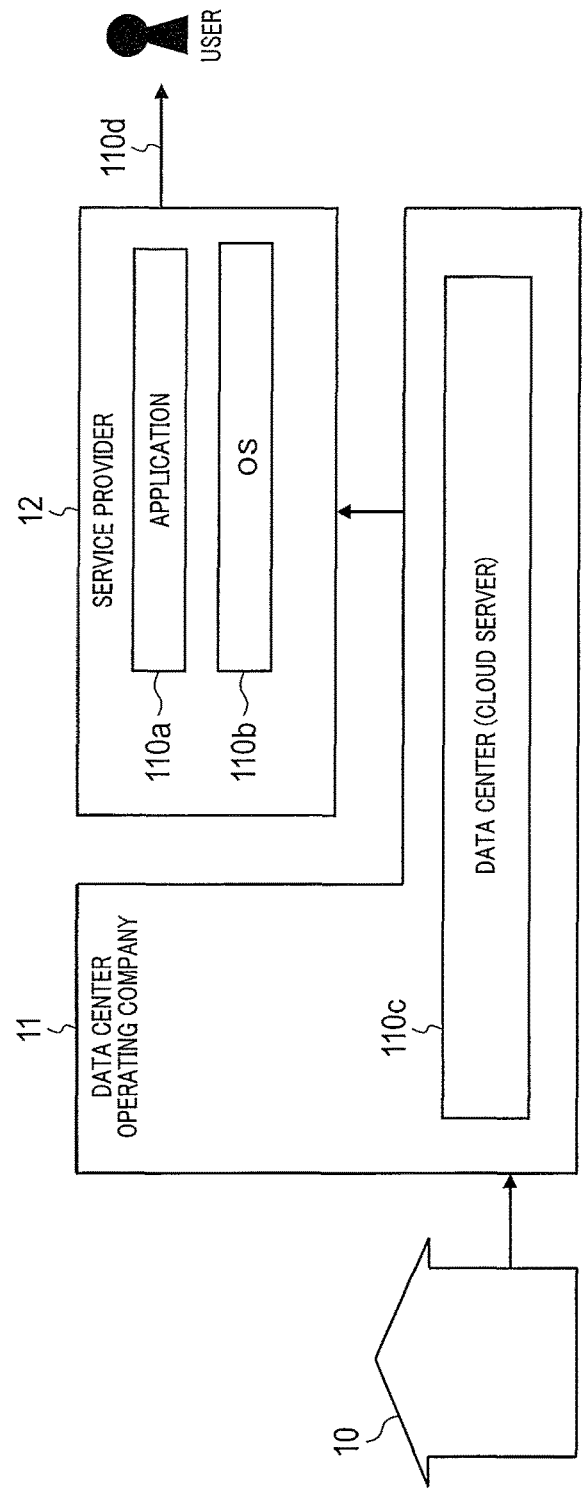
FIG. 21 illustrates service type 2 (IaaS-based type)

FIG. 21 illustrates service type 2 (IaaS-based type). Here, IaaS is abbreviation of Infrastructure as a Service, and is a cloud service provision model in which an infrastructure itself for building and operating a computer system is provided as service via the Internet.

In this type, data center operating company 11 operates and manages a data center (cloud server 11a) (110c). Further, service provider 12 manages OS (110b) and application (110a). Service provider 12 provides service using the OS (110b) and the application (110a) managed by service provider 12 (110d).

(Service Type 3: PaaS-Based Type)

Figure 22:
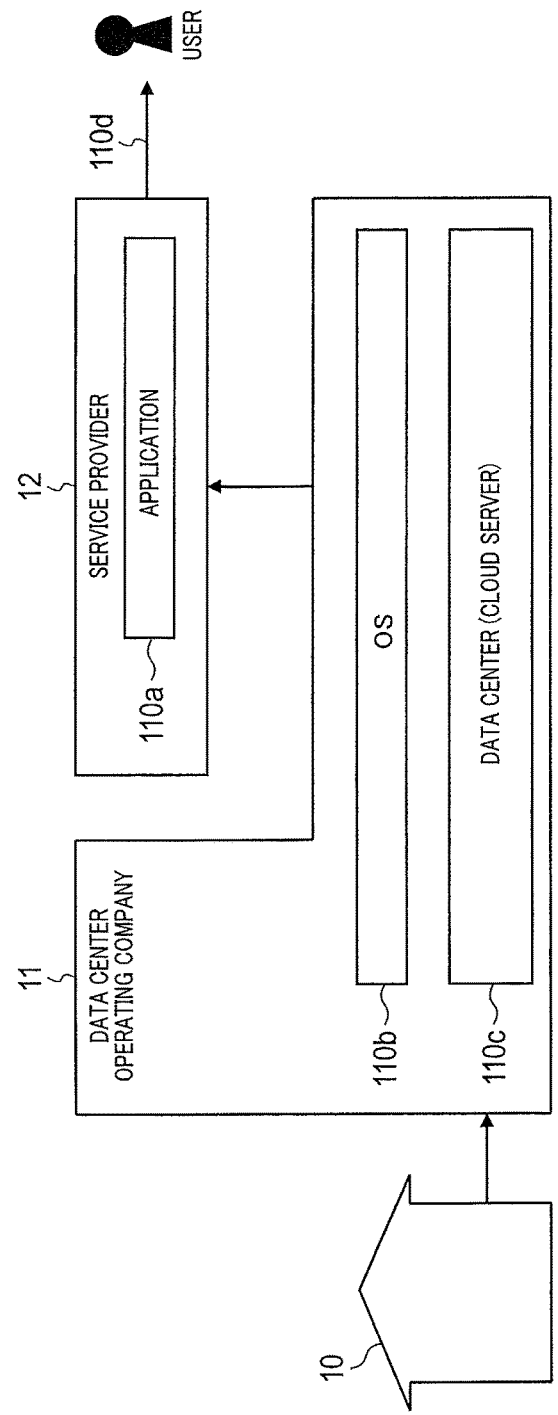
FIG. 22 illustrates service type 3 (PaaS-based type)

FIG. 22 illustrates service type 3 (PaaS-based type). Here, PaaS is abbreviation of Platform as a Service, and is a cloud service provision model in which a platform which becomes a base for developing and operating software is provided as service via the Internet.

In this type, data center operating company 11 manages OS (110b) and operates and manages a data center (cloud server 11a) (110c). Further, service provider 12 manages application (110a). Service provider 12 provides service using the OS (110b) managed by data center operating company 11 and the application (110a) managed by service provider 12 (110d).

(Service Type 4: SaaS-Based Type)

Figure 23:
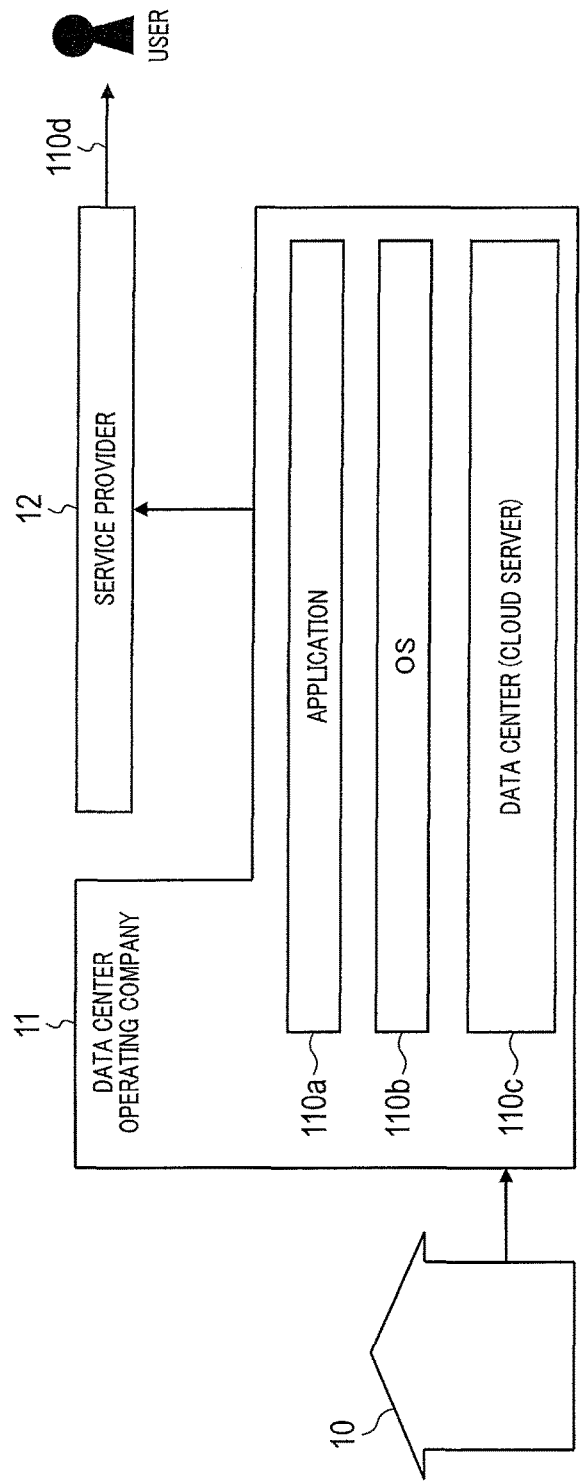
FIG. 23 illustrates service type 4 (SaaS-based type).

FIG. 23 illustrates service type 4 (SaaS-based type). Here, SaaS is abbreviation of Software as a Service. SaaS is, for example, a cloud service provision model which has a function of enabling a company or a person (user) which does not have data center (cloud server 11a) 110c to use application 110a provided by a platform provider having data center (cloud server 11a) 110c via a network such as the Internet.

In this type, data center operating company 11 manages application (110a), manages OS (110b) and operates and manages a data center (cloud server 11a) (110c). Further, service provider 12 provides service using the OS (110b) and the application (110a) managed by data center operating company 11 (110d).

In any of the above-described types, it is assumed that service provider 12 provides service. Further, for example, service provider 12 or data center operating company 11 itself may develop OS 110b, application 110a or database, or the like, of big data or may outsource the development to the third party.

The disclosure of Japanese Patent Application No. 2013-203604, filed on Sep. 30, 2013, including the specification, drawings and abstract is incorporated herein by reference in its entirety.

INDUSTRIAL APPLICABILITY

The server apparatus, the information equipment, the receptacle, the electric charging information generation method and the electric charging information generation program according to the present invention are suitable for use in a system for providing electric charging service.

REFERENCE SIGNS LIST 1, 2 User
10 Group
10a, 100, 200, 900, 1000 Equipment
10b Gateway
11 Data center operating company
11a Cloud server
12 Service provider
12a Server
20 Register
21, 31, 51 Input section
22, 32, 52 Display section
23, 53, 82 Wired communication section
24, 33, 41, 81 Radio communication section
25, 34, 42, 54, 83 Storage section
25a, 34b, 83b Purchase amount information
26, 35, 44, 55, 85 Control section
30 Information equipment
34a, 83a User ID
34c, 42a, 83c Electric charging period information
36 Plug
36a LED
40, 80 Receptacle
43, 84 Electric charging section
50 Server apparatus
54a Electric charging bonus point information
54b Store information
54c Crowded degree adjustment information
54d User information
55a Generating section
55b Store information output section
55c Assigning section
55d Issuing section
60 Base station apparatus
70 Network
100 Computer
101 Input apparatus
102 Output apparatus
103 CPU
104 ROM
105 RAM
106 Storage apparatus
107 Reading apparatus
108 Network card
109 Bus
110a Application
110b OS 110c Data center (cloud server)
110d Service provision

The invention claimed is:

1. An electric charging information generation method in an electric charging system including: a receptacle including an electric charging device which charges up information equipment during an electric charging period for electric charging of the information equipment and a server apparatus including a non-transitory memory storing user information in which a plurality of user identifiers are associated with a corresponding accumulated electric charging bonus point, the electric charging information generation method comprising:
   identifying, by the server apparatus performing searching using the stored user information, a person associated with a user identifier corresponding to an accumulated electric charging bonus point equal to or less than a predetermined value and who is performing the electric charging of the information equipment;
   generating, by the server apparatus, purchase information for display on the information equipment, the purchase information indicating that the electric charging period for the electric charging of the information equipment may be extended by purchase of a product or service;
   transmitting, from the server apparatus to the information equipment, the purchase information;
   determining, by the server apparatus, whether or not purchase amount information has been received from the information equipment, the purchase amount information indicating the purchase of the product or service, and the purchase amount information being generated by a register after receiving input of the purchase of the product or service and transmitted from the register to the server apparatus via the information equipment; and
   when the server apparatus determines that the purchase amount information has been received, (i) increasing the accumulated electric charging bonus point corresponding to the customer identifier in the user information, (ii) generating electric charging information to extend the electric charging period for the electric charging of the information equipment, and (iii) transmitting, from the server apparatus to the receptacle via the information equipment, the electric charging information,
   wherein upon receipt of the electric charging information, the receptacle controls the charging of the information equipment according to the electric charging information.

2. The electric charging information generation method according to claim 1, wherein the electric charging information is generated based on a crowded degree of a store where the register is provided.

3. The electric charging information generation method according to claim 1, wherein the electric charging information is generated based on whether or not the person purchasing the product or the service is registered as a member.

4. The electric charging information generation method according to claim 1, wherein the purchase information is generated based on whether or not the person purchasing the product or the service possesses a product of a predetermined company.

5. The electric charging information generation method according to claim 4, wherein the electric charging information is generated based on frequency of usage of the product of the predetermined company by the person purchasing the product or the service.

6. The electric charging information generation method according to claim 1, further comprising outputting, to the information equipment, information of a store where the information equipment is charged up last time.

7. The electric charging information generation method according to claim 1, further comprising assigning the electric charging period to a person different from the person purchasing the product or the service.

8. The electric charging information generation method according to claim 1, wherein an amount by which the accumulated electric charging bonus point is increased differs depending on day of the week or a time slot when the product or service is purchased.

9. The electric charging information generation method according to claim 1, wherein an amount by which the accumulated electric charging bonus point is increased differs depending on a type of the purchased product or service.

10. The electric charging information generation method according to claim 1, wherein the electric charging information including information of an electric charging period during which electric charging is available for free or information of an electric charge amount available for free.

11. The electric charging information generation method according to claim 10, wherein, in a case where a crowded degree of a store where the register is provided is equal to or greater than a predetermined value, the electric charging period during which electric charging is available for free is shortened or the electric charge amount available for free is reduced compared to a case where the crowded degree is less than the predetermined value.

12. The electric charging information generation method according to claim 1, further comprising searching for a store where a crowded degree is equal to or lower than a predetermined level within a certain distance from a designated store and issuing, to the information equipment, a coupon usable in the store where the crowded degree is equal to or lower than the predetermined level.

13. A non-transitory computer recoding medium having stored thereon an electric charging information generation program for use in an electric charging system including: a receptacle including an electric charging device which charges up information equipment during an electric charging period for electric charging of the information equipment and a server apparatus including a non-transitory memory storing user information in which a plurality of user identifiers are associated with a corresponding accumulated electric charging bonus point, the electric charging information generation program causing the electric charging system to execute processing comprising:
   identifying, by the server apparatus performing searching using the stored user information, a person associated with a user identifier corresponding to an accumulated electric charging bonus point equal to or less than a predetermined value and who is performing the electric charging of the information equipment;
   generating, by the server apparatus, purchase information for display on the information equipment, the purchase information indicating that the electric charging period for the electric charging of the information equipment may be extended by purchase of a product or service;
   transmitting, from the server apparatus to the information equipment, the purchase information;
   determining, by the server apparatus, whether or not purchase amount information has been received from the information equipment, the purchase amount information indicating the purchase of the product or service, and the purchase amount information being generated by a register after receiving input of the purchase of the product or service and transmitted from the register to the server apparatus via the information equipment; and when the server apparatus determines that the purchase amount information has been received, (i) increasing the accumulated electric charging bonus point corresponding to the customer identifier in the user information, (ii) generating electric charging information to extend the electric charging period for the electric charging of the information equipment, and (iii) transmitting, from the server apparatus to the receptacle via the information equipment, the electric charging information, wherein upon receipt of the electric charging information, the receptacle controls the charging of the information equipment according to the electric charging information.

* * * * *